United States Patent
Qian et al.

(10) Patent No.: US 8,168,115 B2
(45) Date of Patent: May 1, 2012

(54) METHODS OF FABRICATING A SUPERABRASIVE COMPACT INCLUDING A DIAMOND-SILICON CARBIDE COMPOSITE TABLE

(75) Inventors: Jiang Qian, Cedar Hills, UT (US); Kenneth E. Bertagnolli, Riverton, UT (US); Michael A. Vail, Genola, UT (US); Jason Wiggins, Draper, UT (US); Jim I. Dewberry, Provo, UT (US); David P. Miess, Highland, UT (US)

(73) Assignee: US Synthetic Corporation, Orem, UT (US)

( * ) Notice: Subject to any disclaimer, the term of this patent is extended or adjusted under 35 U.S.C. 154(b) by 0 days.

(21) Appl. No.: 13/173,292

(22) Filed: Jun. 30, 2011
(Under 37 CFR 1.47)

(65) Prior Publication Data
US 2011/0258937 A1 Oct. 27, 2011

Related U.S. Application Data

(62) Division of application No. 12/001,990, filed on Dec. 12, 2007, now Pat. No. 7,998,573.

(60) Provisional application No. 60/876,702, filed on Dec. 21, 2006, provisional application No. 60/928,228, filed on May 8, 2007.

(51) Int. Cl.
*B32B 9/00* (2006.01)
(52) U.S. Cl. .................. 264/642; 264/667; 264/682
(58) Field of Classification Search .............. 264/642, 264/667, 682
See application file for complete search history.

(56) References Cited

U.S. PATENT DOCUMENTS

| | | |
|---|---|---|
| 3,239,321 A | 3/1966 | Blainey et al. |
| 3,816,085 A | 6/1974 | Hall |
| 4,151,686 A | 5/1979 | Lee et al. |
| 4,167,399 A | 9/1979 | Lee et al. |
| 4,231,195 A | 11/1980 | DeVries et al. |

(Continued)

FOREIGN PATENT DOCUMENTS

EP 0352811 1/1990
(Continued)

OTHER PUBLICATIONS

U.S. Appl. No. 11/424,674, filed Jun. 16, 2006, Bertagnolli.
(Continued)

*Primary Examiner* — Archene Turner
(74) *Attorney, Agent, or Firm* — Workman Nydegger

(57) ABSTRACT

Embodiments relate to superabrasive compacts including a diamond-silicon carbide composite table, and methods of fabricating such superabrasive compacts. In an embodiment, a method of fabricating a superabrasive compact is disclosed. An assembly comprising a mixture including diamond particles and silicon is formed. The silicon comprises amorphous silicon, crystalline silicon crystallized from amorphous silicon formed by a milling process, or combinations thereof. A substrate is positioned in proximity to the mixture. The assembly is subjected to a high-pressure/high-temperature process to form a superabrasive compact comprising a superabrasive table bonded to the substrate. The superabrasive table comprises diamond-silicon carbide composite including diamond grains dispersed through a matrix of silicon carbide grains.

31 Claims, 22 Drawing Sheets

U.S. PATENT DOCUMENTS

| | | | |
|---|---|---|---|
| 4,268,276 A | 5/1981 | Bovenkerk |
| 4,274,900 A | 6/1981 | Mueller et al. |
| 4,380,471 A | 4/1983 | Lee et al. |
| 4,410,054 A | 10/1983 | Nagel et al. |
| 4,468,138 A | 8/1984 | Nagel |
| 4,560,014 A | 12/1985 | Geczy |
| 4,657,090 A | 4/1987 | Geczy |
| 4,738,322 A | 4/1988 | Hall et al. |
| 4,811,801 A | 3/1989 | Salesky et al. |
| 4,874,398 A | 10/1989 | Ringwood |
| 4,913,247 A | 4/1990 | Jones |
| 4,948,388 A | 8/1990 | Ringwood |
| 4,985,051 A | 1/1991 | Ringwood |
| 5,010,043 A | 4/1991 | Ringwood |
| 5,011,514 A | 4/1991 | Cho et al. |
| 5,016,718 A | 5/1991 | Tandberg |
| 5,032,147 A | 7/1991 | Frushour |
| 5,092,687 A | 3/1992 | Hall |
| 5,106,393 A | 4/1992 | Ringwood |
| 5,120,327 A | 6/1992 | Dennis |
| 5,127,923 A | 7/1992 | Bunting et al. |
| 5,135,061 A | 8/1992 | Newton, Jr. |
| 5,147,446 A | 9/1992 | Pechenik et al. |
| 5,151,107 A | 9/1992 | Cho et al. |
| 5,154,245 A | 10/1992 | Waldenstrom et al. |
| 5,364,192 A | 11/1994 | Damm et al. |
| 5,368,398 A | 11/1994 | Damm et al. |
| 5,460,233 A | 10/1995 | Meany et al. |
| 5,480,233 A | 1/1996 | Cunningham |
| 5,544,713 A | 8/1996 | Dennis |
| 5,645,601 A | 7/1997 | Pope et al. |
| 5,645,617 A | 7/1997 | Frushour |
| 5,645,900 A | 7/1997 | Ong et al. |
| 6,165,616 A | 12/2000 | Lemelson et al. |
| 6,393,506 B1 | 5/2002 | Kenny |
| 6,447,852 B1 | 9/2002 | Gordeev et al. |
| 6,454,027 B1 | 9/2002 | Fang et al. |
| 6,759,128 B1 | 7/2004 | Zhao et al. |
| 6,793,681 B1 | 9/2004 | Pope et al. |
| 6,852,414 B1 | 2/2005 | Frushour |
| 6,892,836 B1 | 5/2005 | Eyre et al. |
| 6,939,506 B2 | 9/2005 | Qian et al. |
| 7,060,641 B2 | 6/2006 | Qian et al. |
| 7,377,341 B2 | 5/2008 | Middlemiss et al. |
| 7,473,287 B2 | 1/2009 | Belnap et al. |
| 7,516,804 B2 | 4/2009 | Vail |
| 7,959,841 B2 | 6/2011 | Zhao |
| 2003/0157407 A1 | 8/2003 | Kosuzu et al. |
| 2005/0050801 A1 | 3/2005 | Cho et al. |
| 2005/0230156 A1 | 10/2005 | Belnap et al. |
| 2005/0263328 A1 | 12/2005 | Middlemiss |
| 2007/0079994 A1 | 4/2007 | Middlemiss |
| 2008/0206576 A1 | 8/2008 | Qian et al. |

FOREIGN PATENT DOCUMENTS

| | | |
|---|---|---|
| EP | 0422435 | 4/1991 |
| GB | 2362655 | 11/2001 |
| JP | 56-9276 | 1/1981 |
| JP | 59-69472 | 4/1984 |
| JP | 62-271604 | 11/1987 |
| JP | 01-056363 | 3/1989 |
| JP | 2000/203955 | 7/2000 |
| WO | WO86/01433 | 3/1986 |
| WO | WO88/07409 | 10/1988 |

OTHER PUBLICATIONS

U.S. Appl. No. 11/545,929, filed Oct. 10, 2006, Bertagnolli.
U.S. Appl. No. 11/899,691, filed Sep. 7, 2007, Cooley et al.
U.S. Appl. No. 60/876,702, filed Dec. 21, 2006, Bertagnolli et al.
U.S. Appl. No. 60/928,228, filed May 8, 2007, Miess et al.
A. Shulzhenko, V.G. Gargin, A.A. Bochechka, G.S. Oleinik, and N.V. Danilenko, "Production, Structure, Properties, the Use of Diamond Nanopowders to Strengthen a Diamond-SiC Composite Material," Journal of Superhard Materials, vol. 22, No. 3, pp. 1-13, 2000.
A. Witek, B. Palosz, S. Stel'makh, S. Gierlotka, R. Pielaszek, E. Ekimov, V. Filonenko, A. Gavriliuk, and V. Gryaznov, "Sintering of Compacts from Nanocrystalline Diamonds Without Sintering Agent," Mat. Res. Soc. Symp. Proc., vol. 499, pp. 115-120, 1998.
C. Pantea et al., "Kinetics of SiC formation during high P-T reaction between diamond and silicon," Diamond & Related Materials 14 (2005) pp. 1611-1615.
E.A. Ekimov, A.G. Gavriluk, B. Palosz, S. Glerlotka, P. Dluzewski, E. Tatianin, Yu. Kluev, A.M. Naletov, and A. Presz, "High-Pressure, High-Temperature Synthesis of SiC-Diamond Nanocrystalline Ceramics," Appl. Phys. Lett., vol. 77, No. 7, pp. 954-956, Aug. 2000.
G. Morell, R. S. Katiyar, S. Z. Wiesz and I. Blaberg, "Characterization of the Silicon Network Disorder in Hydrogenated Amorphous Silicon Carbide Alloys with Low Carbon Concentrations," Journal of Non-Crystalline Solids, vol. 194, pp. 78-84, 1996.
G.A. Voronin et al., "Diamond-SiC Nanocomposites Sintered From a Mixture of Diamond and Silicon Nanopowders," Diamond and Related Materials, vol. 12, pp. 1471-1481, 2003.
G.A. Voronin, T.W. Zerda, J. Qian, Y. Zhao, D. He, and S.N. Dub, "Diamond-SiC Nanocoposites Sintered From a Mixture of Diamond and Silicon Nanopowders," DOE study, under W-7405-ENG-36 Program and M. Gearhart, RockBit International, pp. 1-17, unpublished.
G.A. Voronin, "High Pressure Sintering of Diamond and CBN-Based Composite Materials by Infiltration: Main Stages and Regularities," V. Bakel Institue for Superhard Materials of the National Academy of Science of Ukraine, pp. 467.
I.E. Clark and P.A. Bex, "The Use of PCD for Petroleum and Mining Drilling," Industrial Diamond Review, Jan. 1999, pp. 43-49.
J. Qian, G. Voronin, T.W. Zerda, D. He, and Y. Zhao, "High-Pressure, High-Temperature Sintering of Diamond-SiC Composites by Ball-Milled Diamond-Si Mixtures," J. Mater. Res., vol. 17, No. 8, pp. 2153-2160, Aug. 2002.
J. Qian, T.W. Zerda, D. He, L. Daemen, and Y. Zhao, "Micron Diamond Composites with Nanocrystalline Silicon Carbide Bonding," J. Mater. Res., vol. 18, No. 5, pp. 1173-1178, May 2003.
PCT International Search Report for PCT International Application No. PCT/US2007/025578; Apr. 22, 2008.
PCT Written Opinion of the International Searching Authority for PCT International Application No. PCT/US2007/025578; Apr. 22, 2008.
R.A. Andrievski, "Superhard Materials Based on Nanostructured High-Melting Point Compounds: Achievements and Perspectives," International Journal of Refractory Metals & Hard Materials, vol. 19, pp. 447-452, 2001.
S.K. Gordeev, S.G. Zhukov, L.V. Danchukova, and T.C. Ekstrom, "Low-Pressure Fabrication of Diamond-SiC-Si Composites," Inorganic Materials, vol. 37, No. 6, pp. 579-583, 2001.
Stan Veprek, "The search for Novel, Superhard Materials," J. Vac. Sci. Technol. A, vol. 17, No. 5, pp. 2401-2420, 1999.
Wolfgang Tillmann, "Trends and Market Perspectives for Diammond Tools in the Construction Industry," International Journal of Refractory Metals & Hard Materials, vol. 18, pp. 301-306, 2000.
X. Jiang and C.-P. Klages, "Synthesis of Diamond/-β-SiC Composite Films by Microwave Plasma Assisted Chemical Vapor Deposition," Appl. Phys. Lett. vol. 61, No. 14, pp. 1629-1631, Oct. 1992.
Y.S. S Ko, T. T Tsurnumi, O. Fukunaga, and T. Yano, "High Pressure Sintering of Diamond-SiC Composite," Journal of Material Science, vol. 36, pp. 469-475, 2001.
Y. Zhao et al. "Enhancement of Fracture Toughness in Nanostructure Diamond SiC Composites," Applied Physics Letters, vol. 84, No. 5, pp. 1356-1358, Feb. 2004.
U.S. Appl. No. 12/001,990, Jun. 9, 2010, Office Action.
U.S. Appl. No. 12/001,990, Sep. 16, 2010, Office Action.
U.S. Appl. No. 12/001,990, Mar. 31, 2011, Notice of Allowance.
U.S. Appl. No. 12/001,990, May 6, 2011, Notice of Allowance.
U.S. Appl. No. 12/001,990, Jul. 27, 2011, Issue Notification.

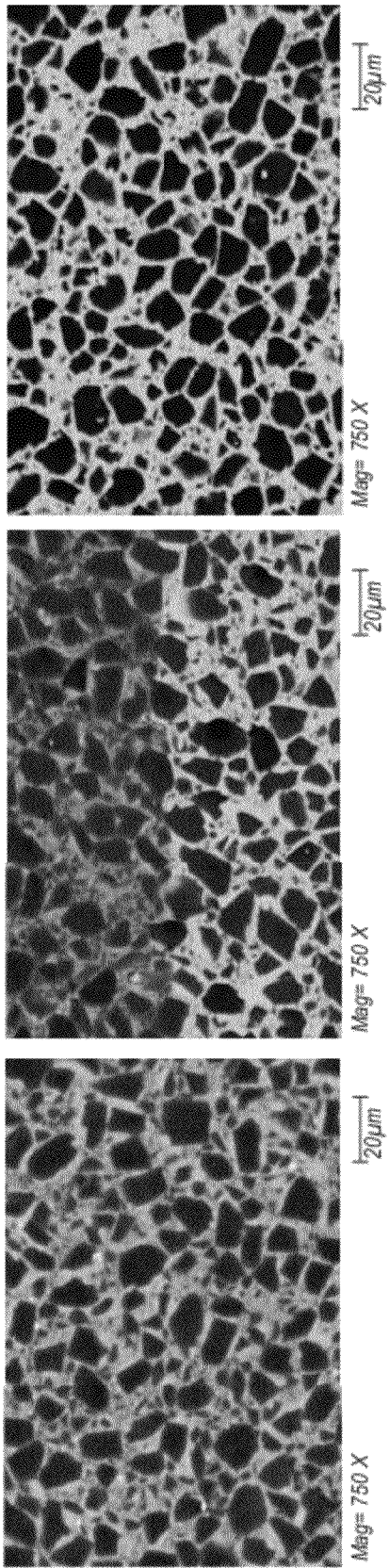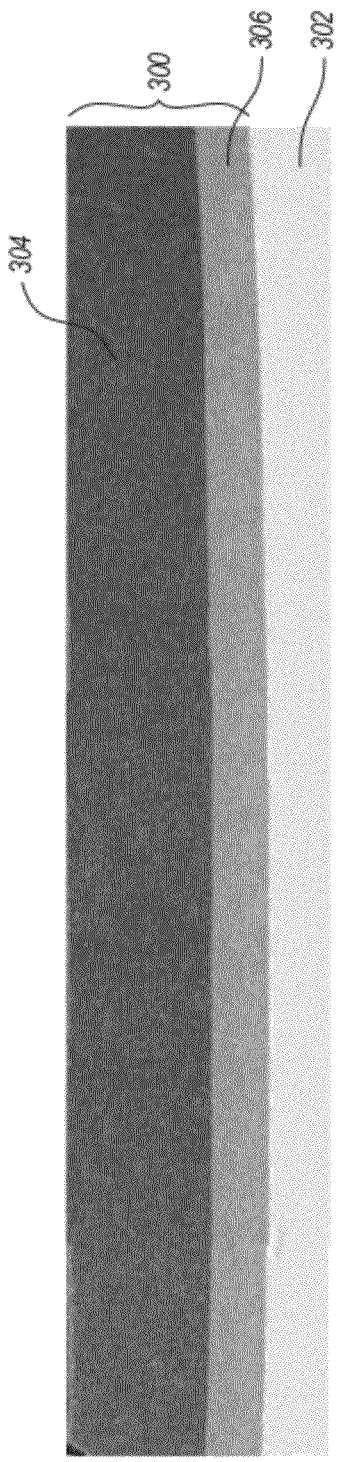
FIG. 21C
FIG. 21D
FIG. 21B
FIG. 21A

METHODS OF FABRICATING A SUPERABRASIVE COMPACT INCLUDING A DIAMOND-SILICON CARBIDE COMPOSITE TABLE

CROSS-REFERENCE TO RELATED APPLICATIONS

This application is a divisional of U.S. application Ser. No. 12/001,990 filed on 12 Dec. 2007, which claims the benefit of U.S. Provisional Application No. 60/876,702 filed on 21 Dec. 2006 and U.S. Provisional Application No. 60/928,228 filed on 8 May 2007, the disclosures of each of the foregoing applications are incorporated herein, in their entirety, by this reference.

BACKGROUND

Wear-resistant, superabrasive compacts are utilized in a variety of mechanical applications. For example, polycrystalline diamond ("PCD") superabrasive compacts are used in drilling tools (e.g., cutting elements, gage trimmers, etc.), machining equipment, bearing apparatuses, wire-drawing machinery, and in other mechanical systems.

Conventional polycrystalline diamond compacts ("PDCs") have found particular utility as superabrasive cutting elements in rotary drill bits, such as roller cone drill bits and fixed cutter drill bits. A conventional PDC cutting element or cutter typically includes a superabrasive diamond layer or table. The diamond table is formed and bonded to a substrate using an ultra-high pressure, ultra-high temperature ("HPHT") process. The PDC cutting element may be brazed directly into a preformed pocket, socket, or other receptacle formed in the rotary drill bit. In another configuration, the substrate may be brazed or otherwise joined to an attachment member such as a stud or a cylindrical backing. Such a stud carrying the PDC may be used as a PDC cutting element when mounted to a rotary drill bit by press-fitting, brazing, or otherwise securing the stud into a receptacle formed in the rotary drill bit. Generally, a rotary drill bit may include one or more PDCs affixed to a bit body of the rotary drill bit.

Conventional PDCs are normally fabricated by placing a cemented-carbide substrate into a container or cartridge with a volume of diamond particles positioned on a surface of the cemented-carbide substrate. A number of such cartridges may be typically loaded into a HPHT press. The substrates and volume of diamond particles are then processed under HPHT conditions in the presence of a catalyst material that causes the diamond particles to bond to one another to form a matrix of bonded diamond grains defining a diamond table. The catalyst material is often a solvent catalyst, such as cobalt, nickel, or iron that is used for facilitating intergrowth between the diamond particles.

In one conventional approach, a constituent of the cemented-carbide substrate, such as cobalt from a cobalt-cemented tungsten carbide substrate, liquefies and sweeps from the region adjacent to the volume of diamond particles into interstitial regions between the diamond particles during the HPHT process. The cobalt acts as a catalyst to facilitate intergrowth between the diamond particles, which results in bonds between adjacent diamond particles. A solvent catalyst may be mixed with the diamond particles prior to subjecting the diamond grains and substrate to the HPHT process.

The solvent catalyst dissolves carbon from the diamond particles or portions of the diamond particles that graphitize due to the high temperature being used in the HPHT process. The solubility of the stable diamond phase in the solvent catalyst is lower than that of the metastable graphite under HPHT conditions. As a result of this solubility difference, the undersaturated graphite tends to dissolve into the solvent catalyst and the supersaturated diamond tends to deposit onto existing diamond particles to form diamond-to-diamond bonds. Accordingly, diamond particles become mutually bonded to form a matrix of PCD with interstitial regions between bonded diamond grains being occupied by the solvent catalyst.

The presence of the solvent catalyst in the diamond table is believed to reduce the thermal stability of the diamond table at elevated temperatures. For example, the difference in thermal expansion coefficient between the diamond grains and the solvent catalyst is believed to lead to chipping or cracking in the PDC during drilling or cutting operations, which consequently can degrade the mechanical properties of the PDC or cause failure. Additionally, some of the diamond grains can undergo a chemical breakdown or back-conversion to graphite via interaction with the solvent catalyst. At extremely high temperatures, portions of diamond grains may transform to carbon monoxide, carbon dioxide, graphite, or combinations thereof, thus, degrading the mechanical properties of the PDC.

One conventional approach for improving the thermal stability of PDCs is to at least partially remove the solvent catalyst from the PDC by acid leaching. However, removing the solvent catalyst from the PDC can be relatively time consuming for high-volume manufacturing. Therefore, manufacturers and users of superabrasive materials continue to seek improved thermally-stable superabrasive materials and processing techniques.

SUMMARY

Embodiments of the present invention relate to diamond-silicon carbide composites, superabrasive compacts including such diamond-silicon carbide composites, and methods of fabricating such diamond-silicon carbide composites and superabrasive compacts. In one embodiment of the present invention, a superabrasive compact includes a substrate and a superabrasive table bonded to the substrate. The superabrasive table comprises diamond-silicon carbide composite including a matrix comprising nanometer-sized silicon carbide grains and micrometer-sized diamond grains dispersed through the matrix.

In some embodiments of the present invention, one or more transition layers may be disposed between the substrate and superabrasive table to reduce a residual stress gradient between the substrate and superabrasive table. In other embodiments of the present invention, at least one layer of polycrystalline diamond may be disposed between the superabrasive table and substrate. In certain embodiments of the present invention, the superabrasive compact may include a barrier layer disposed between the substrate and superabrasive table or disposed between another layer (e.g., as a transition layer or an intermediate PCD layer) and the superabrasive table.

In another embodiment of the present invention, a method of fabricating a superabrasive compact is disclosed. An assembly comprising a mixture including diamond particles and silicon is formed. The silicon may comprise amorphous silicon, crystalline silicon crystallized from amorphous silicon formed by a milling process, or combinations thereof. A substrate is positioned in proximity to the mixture. The assembly is subjected to heat and pressure to form a superabrasive compact comprising a superabrasive table bonded to the substrate. The superabrasive table comprises diamond-silicon carbide composite including diamond grains dispersed through a matrix of silicon carbide grains. In one embodiment of the present invention, one or more transition layer mixtures may be positioned between the mixture and substrate to moderate residual stresses during formation of the superabrasive compact. In other embodiments of the present invention, at least one layer of diamond particles may be disposed between the mixture and substrate. In yet another embodiment of the present invention, a barrier layer may be disposed between the mixture and substrate to help prevent silicon from the mixture from interacting with metal-solvent catalyst from the substrate or another source.

In another embodiment of the present invention for fabricating a superabrasive compact, a superabrasive table comprising diamond-silicon carbide composite may be separately formed and bonded to a substrate or a substrate carrying a transition layer. In yet another embodiment of the present invention, the superabrasive table comprising diamond-silicon carbide may be integrally formed with a transition layer, and the transition layer subsequently bonded to a substrate.

Additional embodiments of the present invention relate to applications utilizing the disclosed diamond-silicon carbide composites and superabrasive compacts in various articles and apparatuses, such as rotary drill bits, machining equipment, bearing apparatuses, wire-drawing dies, medical implements, and other articles and apparatuses.

BRIEF DESCRIPTION OF THE DRAWINGS

The drawings illustrate several embodiments of the present invention, wherein like reference numerals refer to like elements in different views or embodiments shown in the drawings.

FIG. 21A is a low magnification photomicrograph taken using a scanning electron microscope of a superabrasive compact fabricated according to example 5 of the present invention.

FIG. 21B is a photomicrograph taken using a scanning electron microscope showing the microstructure of an upper region of the superabrasive table shown in FIG. 21A.

FIG. 21C is a photomicrograph taken using a scanning electron microscope showing the microstructure of a lower region of the superabrasive table shown in FIG. 21A.

FIG. 21D is a photomicrograph taken using a scanning electron microscope showing the microstructure of the superabrasive table shown in FIG. 21A proximate the interface between the upper and lower regions.

DETAILED DESCRIPTION

Embodiments of the present invention relate to diamond-silicon carbide composites that comprise diamond grains dispersed in a matrix including nanometer-sized silicon carbide grains. Methods of fabricating such diamond-silicon carbide composites and applications utilizing such diamond-silicon carbide composites are also disclosed. The diamond-silicon carbide composites disclosed herein may be used in a variety of applications, such as drilling tools (e.g., superabrasive compacts, gage trimmers, etc.), machining equipment, bearing apparatuses, wire-drawing machinery, and other apparatuses. As used herein, the term "superabrasive" means a material that exhibits a hardness exceeding a hardness of tungsten carbide.

Figure 1:
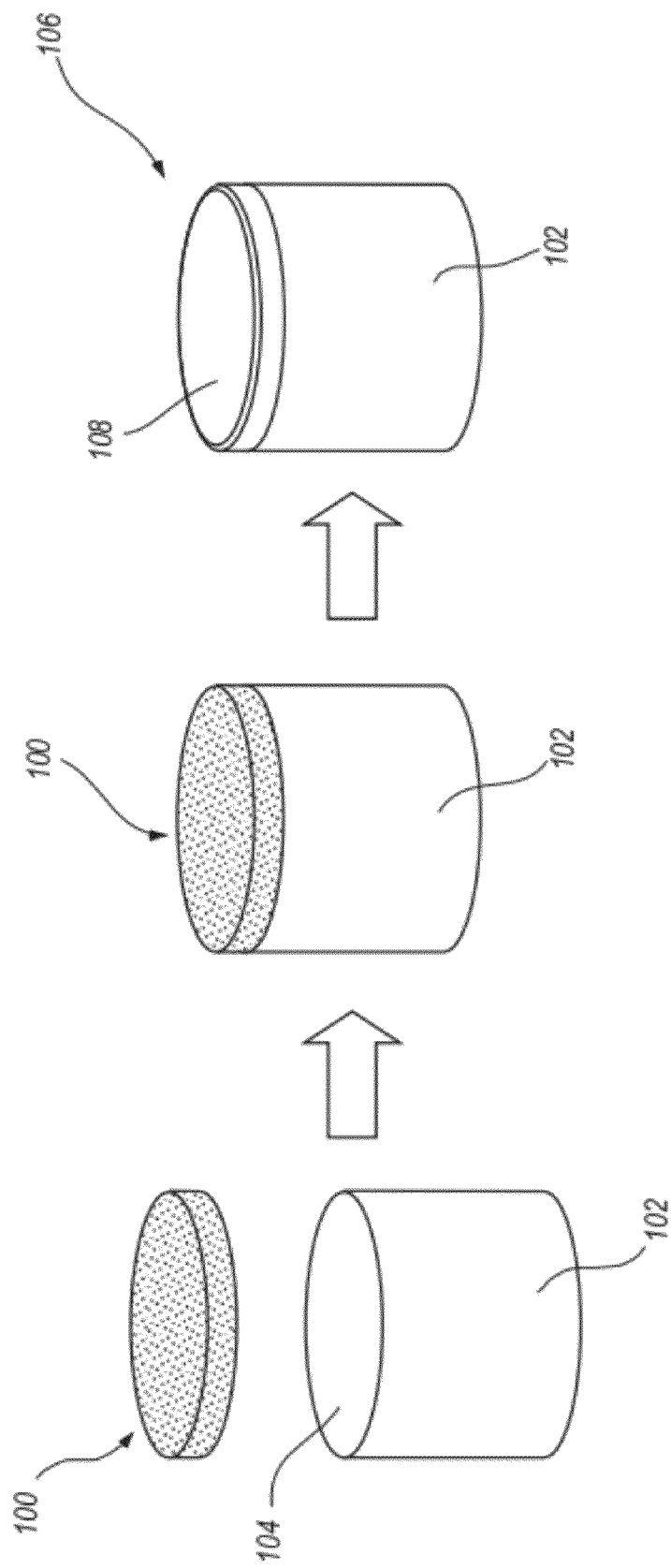
FIG. 1 is a schematic diagram illustrating a method for fabricating a superabrasive compact including a superabrasive table comprising diamond-silicon carbide composite according to various embodiment of the present invention.

FIG. 1 schematically illustrates a method of fabricating a superabrasive compact including a superabrasive table comprising diamond-silicon carbide composite and the superabrasive compact so-formed according to various embodiments of the present invention. Referring to FIG. 1, a particulate mixture 100 is positioned adjacent to an interfacial surface 104 of a suitable substrate 102. The particulate mixture 100 may comprise about 80 weight percent to about 90 weight percent diamond particles and about 10 weight percent to about 20 weight percent silicon particles. The diamond particles may exhibit an average particle size of at least about 1 μm. More particularly, the diamond particles may exhibit an average particle size of about 1 μm to about 150 μm, and more specifically about 25 μm to about 40 μm. In some embodiments of the present invention, the diamond particles may exhibit a bi-modal or greater distribution of nanometer-sized diamond particles with an average particle size of about 1 nm to about 150 nm and relatively larger, micrometer-sized diamond particles with an average particle size of about 1 μm to about 100 μm. The nanometer-sized diamond particles may include nanometer-sized conventional diamond particles, ultra-dispersed diamond particles as disclosed in U.S. patent application Ser. No. 11/496,905, or both. U.S. patent application Ser. No. 11/496,905 is incorporated herein, in its entirety, by this reference. For example, the nanometer-sized diamond particles exhibiting an average particle size of about 100 nm may comprise about 1 weight percent to about 6 weight percent of the particulate mixture. In some embodiments of the present invention, the diamond particles may include agglomerated granules comprising diamond particles as disclosed in U.S. patent application Ser. No. 11/424,674, the disclosure of which is incorporated herein, in its entirety, by this reference. The silicon particles may exhibit an average particle size of about 1 μm to about 50 μm, and more particularly about 30 μm to about 40 μm.

In some embodiments of the present invention, the particulate mixture 100 may be formed by mixing the diamond particles and silicon particles together using a ball mill (e.g., a planetary ball mill), an attrition mill, or the like. For example, milling apparatuses may employ one or more mixing elements, such as balls, rods, or other shapes to effect mixing of the diamond and silicon particles. Optionally, such mixing may be performed under an inert atmosphere, such as argon, for several hours (e.g., about 1 to about 30 hours). For example, the particulate mixture 100 may be formed by ball milling the diamond particles and silicon particles for three ball-mill cycles, each of which is about 95 minutes to about 100 minutes. In another embodiment of the present invention, the particulate mixture 100 may be formed by jet milling the diamond particles and the silicon particles. In any of the above-mentioned milling processes, the milling process may cause diamond particles to become at least partially or completely coated with a material comprising silicon. The parameters of the milling process may be selected and performed for a sufficient time to transform substantially all of the silicon particles from crystalline silicon to amorphous silicon, with the milling time not being so long so that the diamond particles and/or the silicon oxidize even when milled under a substantially inert atmosphere. In other embodiments, the diamond particles and silicon may be mixed with an organic liquid (e.g., heptane or other organic liquid) to help prevent oxidation during the milling process, prevent agglomeration of the milled particles, or both. Additionally, the ball milling of the diamond particles and the silicon particles may fracture a portion of the micrometer-sized diamond particles to form nanometer-sized diamond particles (e.g., exhibiting a size of about 10 nm to about 100 nm). In another embodiment of the present invention, the silicon particles may be initially provided in amorphous form and mixed together with the diamond particles.

In other embodiments of the present invention, the diamond particles may be coated with silicon using a deposition process, such as chemical vapor deposition ("CVD"), physical vapor deposition ("PVD"), thermal spraying, or another suitable deposition process. The phrase "particulate mixture" used herein includes diamond particles at least partially coated with another material. Mixtures of diamond particles coated by different methods may also be employed in any of the embodiments of the present invention disclosed herein.

In certain embodiments of the present invention, after intimately mixing the diamond particles and the silicon particles, a toughening constituent may be mixed with the silicon-coated diamond particles. For example, in one embodiment of the present invention, the toughening constituent may comprise particles in the form of whiskers, polycrystalline particles, and/or single crystal particles comprised of carbides of Group IIA elements, IVA elements, IVB elements, VB elements, VIB elements, and combinations of any of the preceding carbides that may be mixed with the silicon-coated diamond particles using any of the aforementioned mixing processes or a less aggressive mixing process, such as a Turbula® shaker-mixer from Willy A. Bachofen AG Maschinenfabrik of Basil, Switzerland. In a more specific embodiment of the present invention, the toughening constituent may comprise alpha silicon carbide particles, beta silicon carbide particles, or both. In yet another embodiment of the present invention, the toughening constituent may comprise any other suitable silicon-based ceramic (e.g., silicon nitride), aluminum-based ceramic (e.g., aluminum oxide), boron-based ceramic (e.g., boron oxides), iron/iron oxide-based ceramic, yttrium-based ceramic (e.g., yttrium oxide), zinc-based ceramic (e.g., zinc oxide), zirconium-based ceramic (e.g., zirconium oxide), and combinations of any of the preceding ceramics. The toughening constituent may comprise one or more of the aforementioned toughening constituents in an amount of about 1 to about 20 weight percent of the particulate mixture 100. More specifically, the toughening constituent may comprise about 1 to about 5 weight percent, about 5 to about 10 weight percent, about 10 to about 15 weight percent, or about 15 to about 20 weight percent of the particulate mixture.

Still referring to FIG. 1, the substrate 102 may be generally cylindrical or another selected configuration, without limitation. Although the interfacial surface 104 is illustrated as being substantially planar, the interfacial surface 104 may exhibit a selected nonplanar topography, without limitation. The substrate 102 may include a metal-solvent catalyst, such as cobalt in a cobalt-cemented tungsten carbide or another suitable material. Other materials that may be used for the substrate 102 include, without limitation, cemented carbides including titanium carbide, niobium carbide, tantalum carbide, vanadium carbide, and combinations of any of the preceding carbides cemented with cobalt, iron, nickel, or alloys thereof. The substrate 102 may also comprise a ceramic material that is not cemented with a metal-solvent catalyst.

The particulate mixture 100 and the substrate 102 are subjected to a HPHT sintering process to form a superabrasive compact 106 that includes a superabrasive table 108 bonded to the interfacial surface 104 of the substrate 102. The HPHT sintering process consolidates the particulate mixture 100 to form the superabrasive table 108 and bonds the superabrasive table 108 to the interfacial surface 104 of the substrate 102. In order to sinter the particulate mixture 100 and the substrate 102, the particulate mixture 100 and the substrate 102 may be placed in a pressure transmitting medium and/or other structure, such as a refractory metal can, graphite structure, pyrophyllite and/or other pressure transmitting structure, or another suitable container or supporting element. Methods and apparatuses for sealing enclosures suitable for holding the particulate mixture 100 and the substrate 102 are disclosed in U.S. patent application Ser. No. 11/545,929, which is incorporated herein, in its entirety, by this reference. In some embodiments of the present invention, the container for holding the particulate mixture 100 and the substrate 102 is vacuum sealed at a temperature of about 1000° Celsius, which may partially or completely transform amorphous silicon present in the particulate mixture to crystalline silicon. When the particulate mixture 100 is formed by milling the diamond particles and silicon in the presence of an organic liquid (e.g., heptane), the particulate mixture 100 may be dried before loading into the pressure transmitting medium.

The pressure transmitting medium, including the particulate mixture 100 and the substrate 102, is subjected to a HPHT process using an ultra-high pressure press at a temperature of at least about 1000° Celsius (e.g., about 1100° Celsius to about 2200° Celsius) and a pressure of at least about 40 kilobar (e.g., about 50 kilobar to about 80 kilobar) for a time sufficient to sinter the particulate mixture 100 and form the superabrasive table 108 comprising the diamond-silicon carbide composite. The HPHT sintering process also bonds the superabrasive table 108 to the substrate 102. During the HPHT sintering process, the diamond particles and the silicon (e.g., silicon particles or silicon coating the diamond particles) chemically react to form silicon carbide. The silicon carbide formed from the reaction between the diamond particles and the silicon may form beta silicon carbide having a face centered cubic ("FCC") crystal structure. When alpha silicon carbide particles are present in the particulate mixture, the alpha silicon carbide particles may retain their hexagonal close packed ("HCP") crystal structure even after the HPHT sintering process.

The resultant structure of the HPHT sintered diamond-silicon carbide composite comprising the superabrasive table 108 includes micrometer-sized diamond grains dispersed in a matrix comprising nanometer-sized silicon carbide grains. It is currently believed by the inventors that the presence of amorphous silicon in the particulate mixture 100 used to form the diamond-silicon carbide composite may assist with nucleation of nanometer-sized silicon carbide grains instead of micrometer-sized silicon carbide grains. The presence of amorphous silicon in the particulate mixture 100 may assist with nucleation of nanometer-sized silicon carbide grains even when the amorphous silicon is at least partially or completely transformed to crystalline silicon during sealing of the container prior to subjecting the particulate mixture to HPHT sintering conditions. In some embodiments of the present invention, the matrix further includes nanometer-sized diamond grains dispersed therethrough as a result of nanometer-sized diamond particles used to form the particulate mixture 100, the milling process fracturing micrometer-sized diamond particles into nanometer-sized diamond particles, or both. The average grain size (i.e., post sintering) of the nanometer-sized silicon carbide grains and nanometer-sized diamond grains in the matrix may be about 10 nm to about 900 nm, more particularly about 10 nm to about 500 nm, and even more particularly about 50 nm to about 200 nm (e.g., about 100 nm). The average grain size of the micrometer-sized diamond grains may be at least about 1 µm. More particularly, the average grain size of the micrometer-sized diamond grains may be about 1 µm to about 150 µm, and more specifically about 10 µm to about 35 µm.

In certain embodiments of the present invention, the matrix may include one or more of the aforementioned toughening constituents. For example, when alpha silicon carbide particles are added to the particulate mixture 100, the matrix of the diamond-silicon carbide composite may also comprise alpha silicon carbide grains and beta silicon carbide grains formed from a reaction between the diamond particles and the silicon. The combination of the alpha silicon carbide grains and the beta silicon carbide gains may form needle-shaped alpha silicon carbide grains at least partially surrounded by the beta silicon carbide grains, with the diamond grains dispersed through the matrix of alpha and beta silicon carbide. Such a microstructure for the matrix may impart improved fracture toughness to the diamond-silicon carbide composite of the superabrasive table 108 compared to when only beta silicon carbide is present in the matrix.

The diamond-silicon carbide composite of the superabrasive table 108 may exhibit superior mechanical properties that enable the superabrasive compact 106 to be used in cutting and bearing applications. According to various embodiments of the present invention, the diamond-silicon carbide composite of the superabrasive table 108 so-formed may exhibit a fracture toughness of at least about 10 $MPa \cdot m^{1/2}$ to at least about 12 $MPa \cdot m^{1/2}$, a Vickers hardness of at least about 35 GPa to at least about 50 GPa, and a Knoop hardness of at least about 25 GPa to at least about 45 GPa. The diamond-silicon carbide composites comprising the superabrasive table 108 may further exhibit a density of at least 95 percent of theoretical density and, in some embodiments, fully dense (i.e., about 99 to about 100 percent of theoretical density). Additionally, because the HPHT diamond-silicon carbide composite comprising the superabrasive table 108 may not be formed by liquid infiltration of silicon into a mass of diamond powder, the diamond-silicon carbide composite so-formed may exhibit a substantially uniform density.

In one embodiment of the present invention, a two-step heating process may be used to form the superabrasive compact 106. In such an embodiment, the particulate mixture 100 and substrate 102 are heated to a first temperature (e.g., at least about 800° Celsius) to partially or completely melt the silicon and held at the first temperature for a time sufficient to form the nanometer-sized silicon carbide grains of the diamond-silicon carbide composite of the superabrasive table 108. Then, the particulate mixture 100 and the substrate 102 are heated to a second temperature that is greater than the first temperature to melt the metal-solvent catalyst in the substrate 102 or from another source to bond the substrate 102 to the superabrasive table 108 so-formed. In another embodiment of the present invention, a one-step process may be used to form the superabrasive compact 106 by heating the particulate mixture 100 and the substrate 102 to at least the melting temperature of the metal-solvent catalyst. In one embodiment of the present invention, such a temperature is between about 900° Celsius to about 1500° Celsius.

In either the one-step or two-step heating processes, the metal-solvent catalyst may infiltrate a region of the particulate mixture 100 adjacent to the substrate 102 and at least two regions may be formed in the superabrasive table 108: (1) a lower region bonded to the substrate 102 and (2) an upper region remote from the substrate 102. For example, when the substrate 102 comprises a cobalt-cemented tungsten carbide substrate, the lower region of superabrasive table 108 may include diamond grains dispersed in a matrix comprising one or more of the following phases: cobalt, silicon carbide, cobalt silicide (e.g., $Co_2Si$, $CoSi$, and/or $CoSi_2$), and carbon precipitates. The upper region of the superabrasive table 108 remote from the substrate 102 may exhibit a structure as previously described above for the diamond-silicon carbide composite (i.e., diamond grains dispersed in a matrix including nanometer-sized silicon carbide grains). Thus, the upper region may be substantially free of metal-solvent catalyst, such as cobalt. The formation of silicon carbide in the matrix of the upper region of the superabrasive table 108 may prevent further infiltration of the cobalt into the upper region. The superabrasive table 108 may also include a transition region disposed between the lower and upper regions. The concentration of the cobalt in the transition region may more gradually decrease with distance from the lower region compared to when a more distinct boundary is present between the upper and lower regions. Despite the presence of metal-solvent catalyst in the lower region, the superabrasive table 108 may exhibit limited or substantially no direct bonding between diamond grains. Thus, the superabrasive table 108 may exhibit an absence of widespread and appreciable bonding between diamond grains.

In other embodiments of the present invention, the superabrasive table 108 may be separately formed using a HPHT sintering process and, subsequently, bonded to the interfacial surface 104 of the substrate 102 by brazing, using a separate HPHT bonding process, or any other suitable joining technique, without limitation. Again, when the substrate 102 includes a metal-solvent catalyst, such as cobalt in a cobalt-cemented tungsten carbide substrate, metal-solvent catalyst may infiltrate a portion of the superabrasive table 108.

In yet another embodiment of the present invention, the superabrasive table 108 may be separately formed using a HPHT sintering process and a binderless carbide layer, such as a tungsten carbide layer, may be deposited on the superabrasive table 108 using CVD or physical vapor deposition ("PVD"), as disclosed in U.S. patent application Ser. No. 11/899,691, to form a superabrasive compact and enable attaching the superabrasive compact to a bit body of a rotary drill bit. U.S. patent application Ser. No. 11/899,691 is incorporated herein, in its entirety, by this reference.

Figure 2:
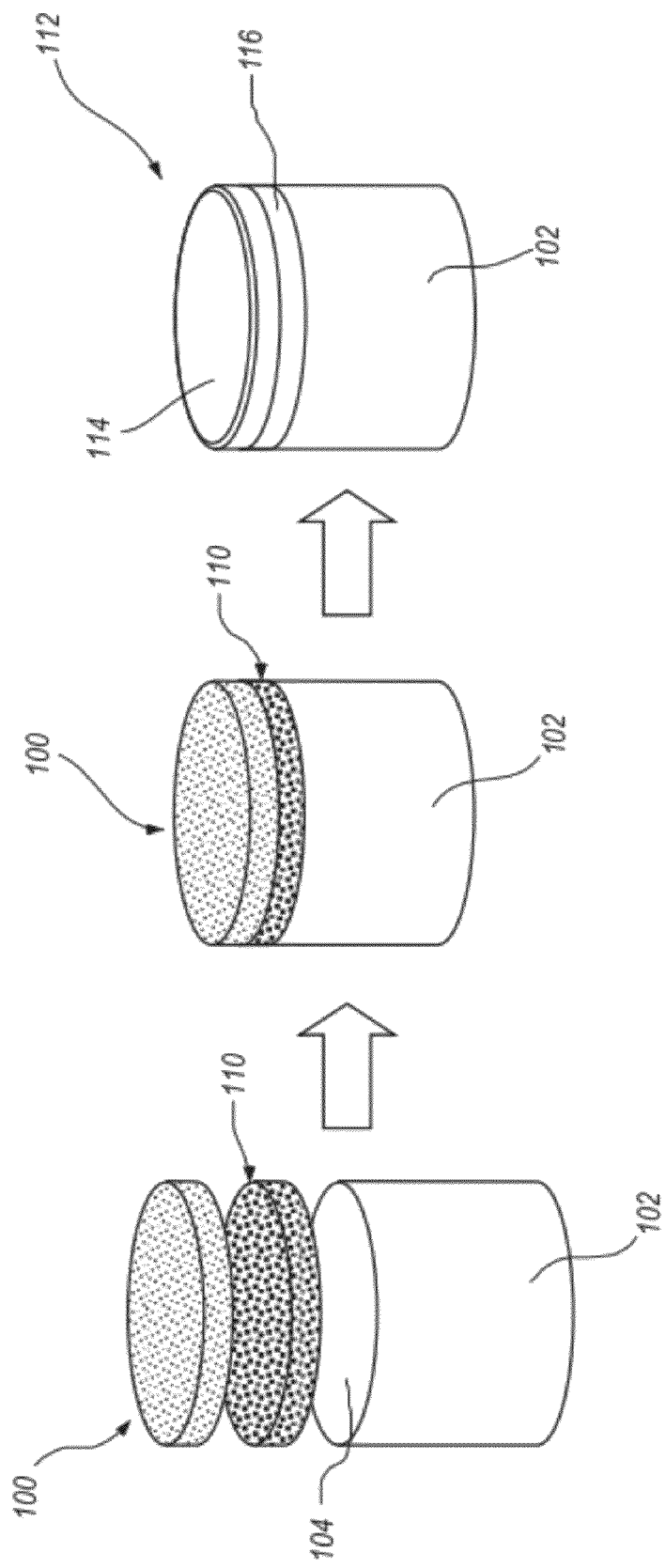
FIG. 2 is a schematic diagram illustrating a method for fabricating a superabrasive compact including a superabrasive table comprising diamond-silicon carbide composite, with an intermediate PCD layer positioned between the superabrasive table and a substrate, according to one embodiment of the present invention.

Referring to FIG. 2, in another embodiment of the present invention, a superabrasive table may be formed by utilizing any of the previously described diamond-silicon formulations and a diamond particle formulation. A layer of diamond particles 110 is positioned adjacent to the interfacial surface 104 of the substrate 102, and between the substrate 102 and particulate mixture 100. The particulate mixture 100, layer of diamond particles 110, and substrate 102 may be subjected to a HPHT sintering process to form a superabrasive compact 112. The superabrasive compact 112 includes a superabrasive table 114 that comprises diamond-silicon carbide composite, as previously described, bonded to an intermediate PCD table 116, which is bonded to the substrate 102. During HPHT sintering, metal-solvent catalyst from the substrate 102 or another source may infiltrate the layer of diamond particles 110 to form polycrystalline diamond with bonded diamond grains and metal-solvent catalyst within the interstitial regions between the bonded diamond grains. A one-step or two-step heating process may also be used as previously described with respect to FIG. 1 to form the superabrasive compact 112. In one embodiment of the present invention, two or more layers of diamond particles may be disposed between the particulate mixture 100 and the substrate 102. For example, each layer of diamond particles may be mixed with a different concentration of metal-solvent catalyst, with the layer adjacent to the substrate 102 including a greater concentration of metal-solvent catalyst than a layer adjacent to the mixture 100.

Instead of HPHT sintering the layer of diamond particles 110, mixture 100, and substrate 102 together, in another embodiment of the present invention, the particulate mixture 100 may be separately HPHT sintered to form a free-standing superabrasive table 114. The separately formed superabrasive table 114 may be subsequently HPHT bonded or otherwise bonded to an upper surface of the PCD table 116 carried on the substrate 102. In yet another embodiment of the present invention, the PCD table 116 and the superabrasive table 114 may each be separately formed and then bonded to the substrate 102 to form the superabrasive compact 112. In yet a further embodiment of the present invention, the superabrasive table 114 and the PCD table 116 may be formed together in a HPHT process and then bonded to the substrate 102 in another HPHT process.

Although the precise physical phenomenon is not entirely understood, it is currently believed by the inventors that formation of nanometer-sized silicon carbide grains within the diamond-silicon carbide composite of the superabrasive table enhances bonding between the superabrasive table and a substrate or an intermediate layer, such as a PCD layer or an intermediate transition layer.

Referring to FIGS. 3-6, additional embodiments of the present invention relate to superabrasive compacts including one or more transition layers formed between a superabrasive table and a substrate. The superabrasive table may comprise any of the previously described diamond-silicon carbide composites. Residual stresses in superabrasive compacts may arise from a difference in thermal expansion between the superabrasive table and the underlying substrate after sintering at HPHT. The residual stresses proximate to the interface between the substrate and the superabrasive table can be sufficient to fracture the bond between the substrate and the superabrasive table. Utilizing one or more transition layers can help moderate the residual stress developed during manufacture of the superabrasive compact so that the superabrasive table remains securely attached to the substrate.

Figure 3:
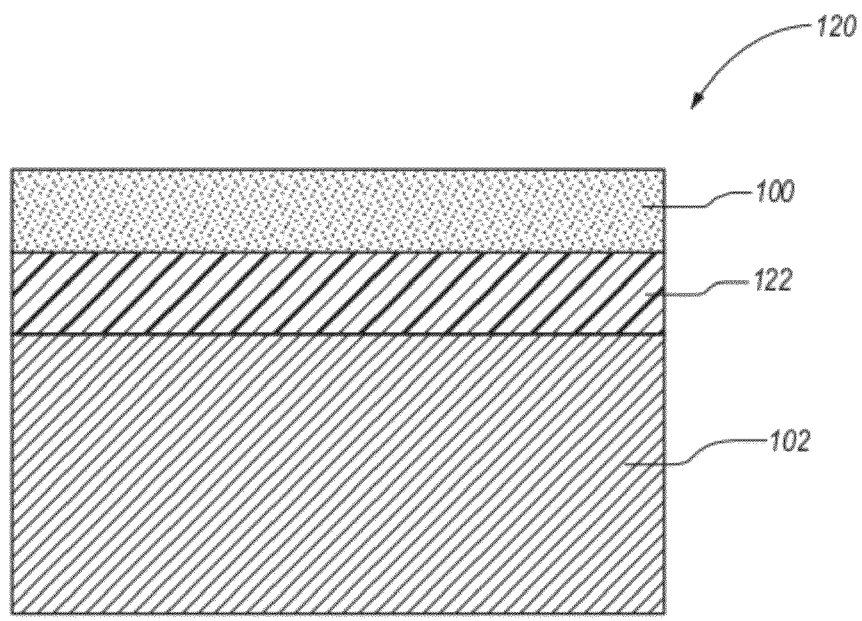
FIG. 3 is a schematic side cross-sectional view of an assembly for forming a superabrasive compact including an intermediate-transition layer disposed between a superabrasive table comprising diamond-silicon carbide composite and a substrate according to another embodiment of the present invention.

Referring to FIG. 3, an assembly 120 includes a substrate 102, a layer of the particulate mixture 100 comprising any of the previously described diamond-silicon formulations, and a transition layer mixture 122 positioned between the substrate 102 and the particulate mixture 100. The transition layer mixture 122 may be formulated to moderate the residual stresses developed during HPHT sintering of the assembly 120 and/or facilitate bonding between the particulate mixture 100 and the substrate 102. In one embodiment of the present invention, when the substrate 102 comprises a cemented tungsten carbide substrate, the transition layer mixture 122 may comprise a mixture of tungsten-carbide particles (or other metal-carbide particles) and diamond particles. In a more specific embodiment of the present invention, the tungsten-carbide particles comprise about 20 volume percent to about 80 volume percent with the diamond particles comprising the remaining volume percent of the transition layer mixture 122. A metal-solvent catalyst, such as cobalt, nickel, iron, or an Invar®-type iron-nickel alloy, may also be added to the transition layer mixture 122.

Figure 4:
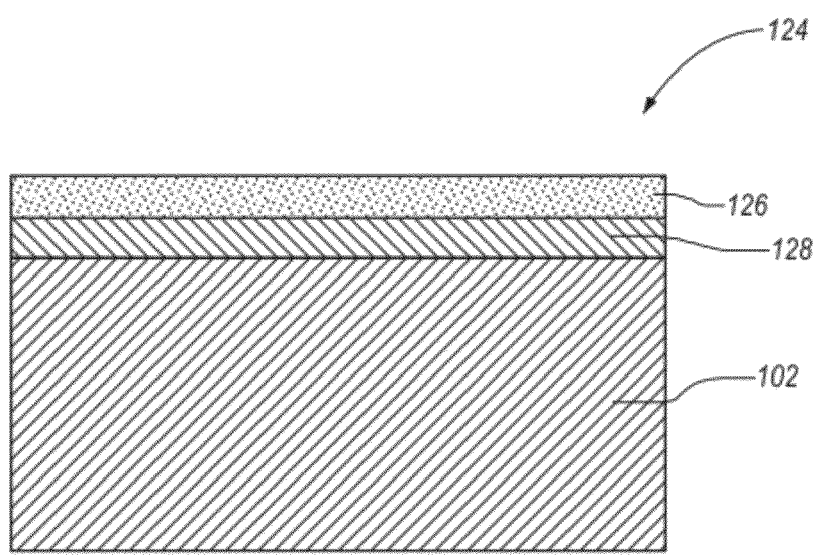
FIG. 4 is a schematic side cross-sectional view of the superabrasive compact formed by HPHT sintering the assembly shown in FIG. 3.
Figure 5:
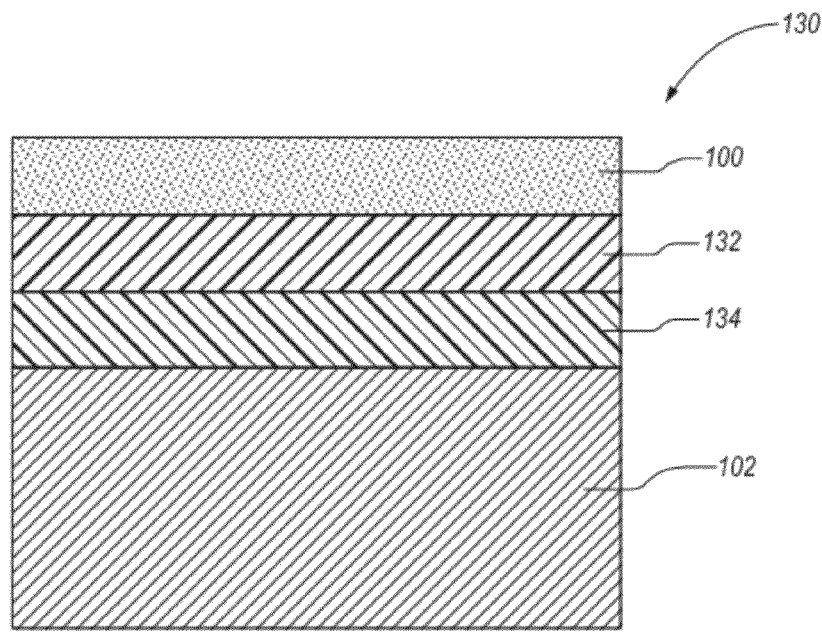
FIG. 5 is a schematic side cross-sectional view of an assembly for forming a superabrasive compact including at least two intermediate-transition layers disposed between a superabrasive table comprising diamond-silicon carbide composite and a substrate according to another embodiment of the present invention.

FIG. 4 is a schematic side cross-sectional view of a superabrasive compact 124 formed after HPHT sintering of the assembly 120. The superabrasive compact 124 includes a superabrasive table 126 that comprises any of the previously described diamond-silicon carbide composites bonded to a transition layer 128 that comprises tungsten-carbide particles, cobalt (or other metal-solvent catalyst) and diamond grains. The transition layer 128 is also bonded to the substrate 102. During HPHT sintering, metal-solvent catalyst from the substrate 102 (e.g., cobalt from a cobalt-cemented tungsten carbide substrate) or another source sweeps into the transition layer mixture 122 to cement the constituents of the transition layer mixture 122 together to form the transition layer 128. Optionally, the transition layer 128 may exhibit a thermal expansion coefficient greater than that of the superabrasive table 126, but less than that of the substrate 102 for reducing the residual stress gradient between the substrate 102 and the superabrasive table 126. Other formulations for the transition layer mixture 122 and the resulting transition layer 128 may also be used to reduce the residual stress gradient between the substrate 102 and the superabrasive table 126 and/or improve bonding characteristics between adjacent regions of the differing materials.

In other embodiments of the present invention, more than one transition layer may comprise a superabrasive compact. Referring to the schematic side cross-sectional view of FIG. 5, an assembly 130 includes a substrate 102, a layer of the particulate mixture 100 comprising any of the previously described diamond-silicon formulations, a first transition layer mixture 132 adjacent to the particulate mixture 100, and a second transition layer mixture 134 adjacent to the substrate 102. Optionally, the first transition layer mixture 132 may include less metal-carbide particles and more diamond particles than that of the second transition layer mixture 134 adjacent to the substrate 102. In one embodiment of the present invention, when the substrate 102 comprises a cemented tungsten carbide substrate, the first transition layer mixture 132 may comprise a mixture of tungsten-carbide particles in an amount of about 30 volume percent and diamond particles in an amount of about 70 volume percent, and the second transition layer mixture 134 may comprise a mixture of tungsten-carbide particles in an amount of about 70 volume percent and diamond particles in an amount of about 30 volume percent. A metal-solvent catalyst, such as cobalt, nickel, iron, or an Invar®-type iron-nickel alloy, may also be added to the first and second transition layer mixtures 132 and 134.

Figure 6:
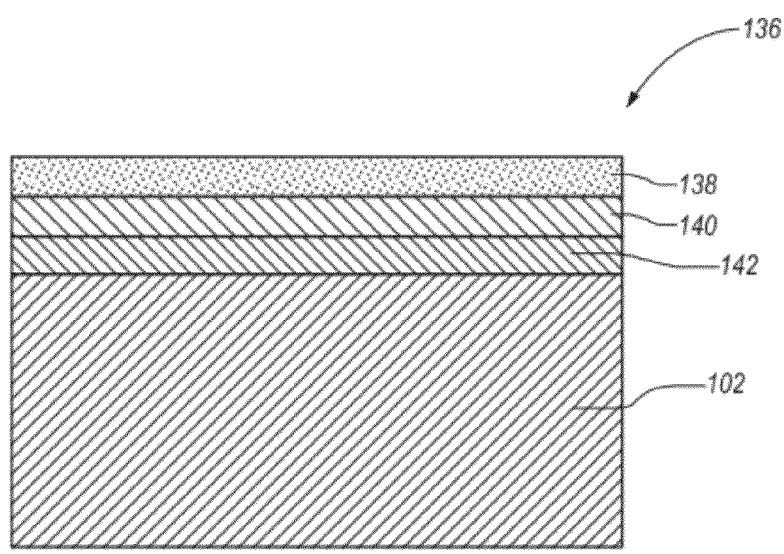
FIG. 6 is a schematic side cross-sectional view of the superabrasive compact formed by HPHT sintering the assembly shown in FIG. 5.

Referring to the schematic side cross-sectional view of FIG. 6, after HPHT sintering of the assembly 130, a superabrasive compact 136 is formed. The superabrasive compact 136 includes a superabrasive table 138 that comprises any of the previously described diamond-silicon carbide composites bonded to a first transition layer 140 that comprises tungsten-carbide particles and diamond grains. A second transition layer 142 is bonded to the first transition layer 140 and to the substrate 102. During HPHT sintering, metal-solvent catalyst from the substrate 102 (e.g., cobalt from a cobalt-cemented tungsten carbide substrate) or another source sweeps into the first and second transition layer mixtures 132 and 134 to cement the constituents thereof together. Optionally, if the first transition layer 140 includes relatively more diamond grains and less metal-carbide particles than that of the second transition layer 142, the residual stress gradient between the substrate 102 and the superabrasive table 138 may be reduced. Other formulations for the transition layer mixtures 132, 134 and the resulting transition layers 140, 142 may be selected to reduce the residual stress gradient between the substrate 102 and the superabrasive table 138 and/or facilitate bonding between regions comprising differing materials.

In another embodiment of the present invention, a superabrasive table comprising diamond-silicon carbide composite, as previously described, may be separately formed in a HPHT process and subsequently bonded to a transition layer formed on a substrate in a subsequent HPHT process. In yet another embodiment of the present invention, a superabrasive table comprising diamond-silicon carbide composite, as previously described, bonded to one or more transition layers may be separately formed in a HPHT process and subsequently bonded to a substrate in a subsequent HPHT process. In yet a further embodiment of the present invention, a superabrasive table comprising diamond-silicon carbide composite, as previously described, may be formed in a first HPHT process, a substrate having one or more transition layer formed thereon may be formed in a second HPHT process, and the superabrasive table may be bonded to one of the transition layers in a subsequent, third HPHT process.

Figure 7:
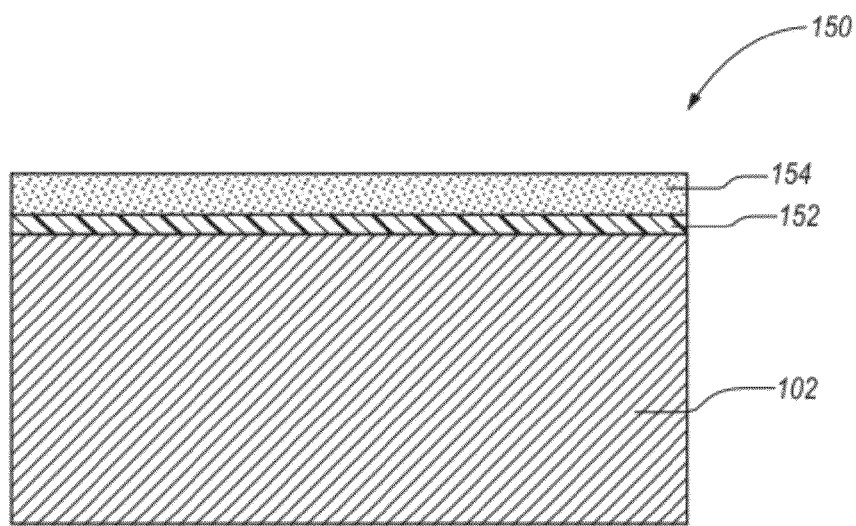
FIG. 7 is a schematic side cross-sectional view of a superabrasive compact including barrier layer positioned between a superabrasive table comprising diamond-silicon carbide composite and a substrate according to one embodiment of the present invention.

In any of the above superabrasive compact embodiments of the present invention, a barrier layer may also be disposed between the particulate mixture 100 comprising a diamond-silicon formulation and a region including a metal-solvent catalyst, such as the substrate 102 or a transition layer comprising polycrystalline diamond. A barrier layer may help prevent chemical interaction between silicon in the particulate mixture 100 and metal-solvent catalyst (e.g., cobalt) during HPHT sintering. For example, FIG. 7 is a schematic side cross-sectional view of a superabrasive compact 150 according to one embodiment of the present invention. The superabrasive compact 150 includes a barrier layer 152 having a thickness, for example, of about 0.001 inch to about 0.005 inch disposed between and bonded to a substrate 102 and a superabrasive table 154 comprising any of the previously described diamond-silicon carbide composites. The barrier layer 152 may comprise a refractory material, such as tantalum, tungsten, niobium, molybdenum, or alloys of any of the preceding metals. The barrier layer 152 may also comprise materials, such as titanium, zirconium, alloys of any of the preceding metals, or another suitable material. Additional materials for the barrier layer 152 include, metal carbides, such as refractory metal-carbides. For example, the barrier layer 152 may comprise tungsten carbide (e.g., binderless or low-binder tungsten carbide).

Figure 8:
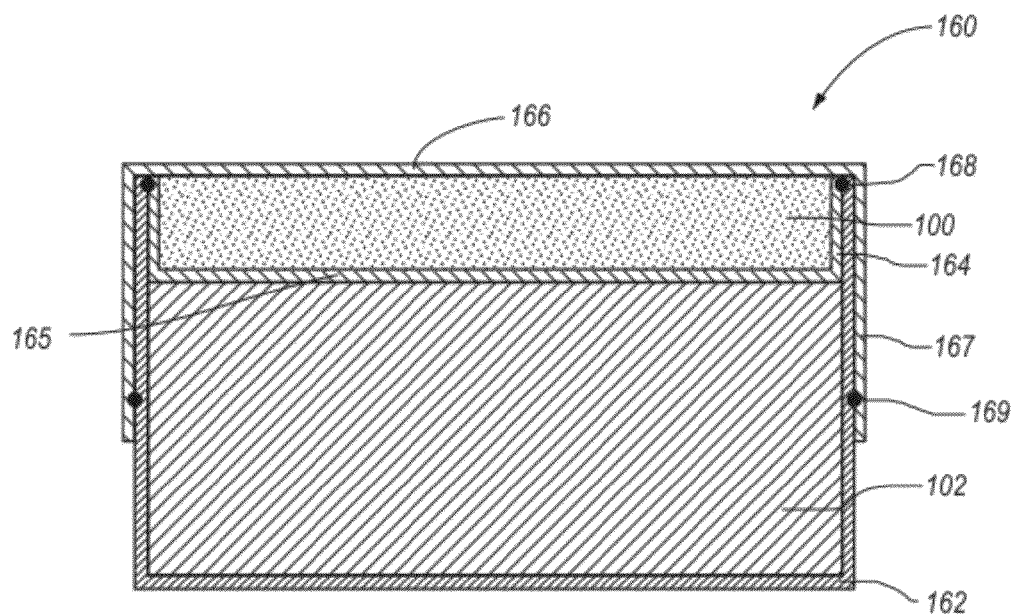
FIG. 8 is a schematic side cross-sectional view of an assembly for forming the superabrasive compact shown in FIG. 7.

FIG. 8 is a schematic side cross-sectional view of an assembly 160, according to one embodiment of the present invention, which may be used to form the superabrasive compact 150 shown in FIG. 7. The assembly 160 includes a first container 162 that receives the substrate 102. A second container 164 is received by the first container 160, and receives the particulate mixture 100. The second container 164 includes a barrier portion 165 that is positioned between the substrate 102 and a particulate mixture 100 comprising any of the previously described diamond-silicon formulations. Accordingly, the second container 164 may be formed from a refractory material, titanium, zirconium, alloys of any of the preceding metals, or another suitable material. Ultimately, the barrier portion 165 forms the barrier layer 152 shown in FIG. 7 after HPHT sintering. A third container 166 receives the first container 162 and a sidewall 167 thereof extends circumferentially about the first container 162. The first container 162 and the second container 164 may be sealed together to substantially prevent silicon from the particle mixture 100 and metal-solvent catalyst (e.g., cobalt) from the substrate 102 from interacting with each other during HPHT sintering. For example, a circumferentially extending bond 168 may be formed using laser welding that substantially seals the first container 162 and second container 164 together. In another embodiment of the present invention, the bond 168 may be formed by brazing the first container 162 and second container 164 together. The assembly 160 may further include a circumferentially extending bond 169 that substantially seals the first container 162 to the third container 166. As with the bond 168, the bond 169 may be formed by laser welding or brazing.

In some embodiments of the present invention, the assembly 160 may be heated to a temperature of at least about 600° Celsius, and in some cases to a temperature of at least about 1100° Celsius in order to de-oxidize the diamond particles of the particulate mixture 100 and remove any surface-bonded hydrogen atoms from the diamond particles prior to forming the bond 169. De-oxidizing the diamond particles and removing any surface-bonded hydrogen atoms from the diamond particles may improve the bond between silicon carbide grains and diamond grains in the final HPHT superabrasive compact. The aforementioned de-oxidizing process may be carried out under vacuum or a suitable inert or reducing environment. After sealing, and optionally cleaning the particulate mixture 100, the assembly 160 is subjected to HPHT process conditions to sinter the various components of the assembly 160 as previously described. After the HPHT process, an abrasive process, such as grit blasting, may be used to remove the first container 162 and the third container 166. Except for the barrier portion 165, all of the second container 164 may also removed by an abrasive process to form the superabrasive compact 150 shown in FIG. 7. In another embodiment of the present invention, the second container 164 may be replaced with a barrier disc or other structure that is positioned between the substrate 102 and the particulate mixture 100.

Still referring to FIG. 8, the barrier portion 165 of the second container 164 may be shaped to provide a non-planar barrier layer. By shaping the barrier layer disposed between the substrate 102 and the superabrasive table comprising diamond-silicon carbide composite, the bond between the barrier layer and the substrate 102 may be enhanced due to increased interfacial area and/or breaking-up internal stresses that may cause delamination during fabrication and use of a superabrasive compact when the barrier layer is planar.

Figure 9:
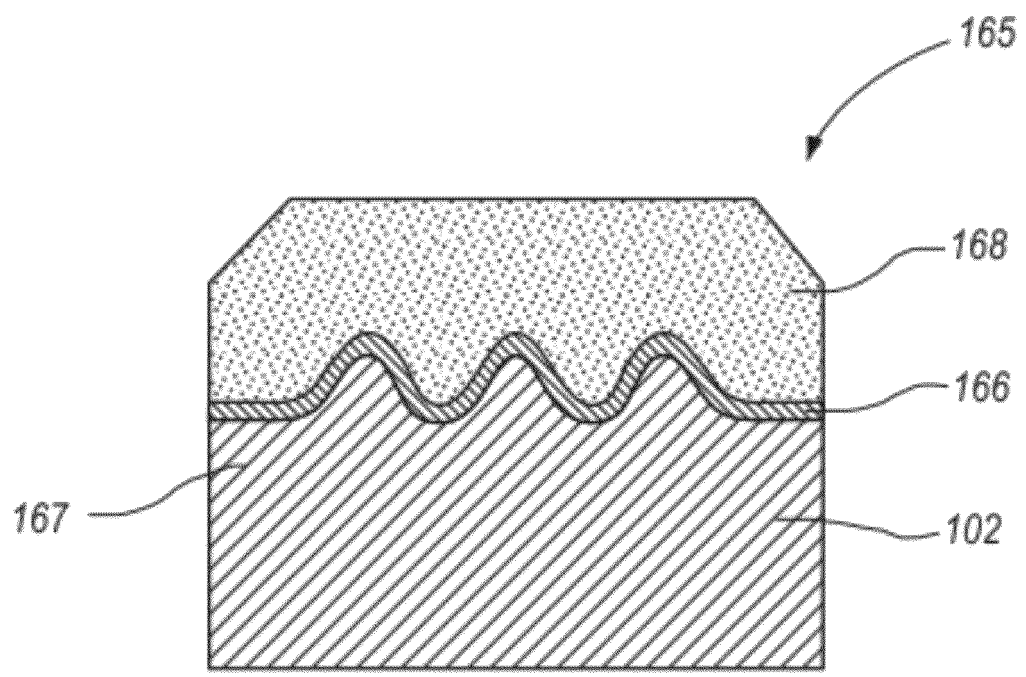
FIG. 9 is a schematic side cross-sectional view of a superabrasive compact including non-planar barrier layer positioned between a superabrasive table comprising diamond-silicon carbide composite and a substrate according to one embodiment of the present invention.

For example, a superabrasive compact 165, according to one embodiment of the present invention, is shown in the schematic side cross-sectional view of FIG. 9. The superabrasive compact 165 includes a non-planer barrier layer 166 bonded to a correspondingly shaped interfacial surface 167 of the substrate 102. A superabrasive table 168 comprising any of the previously described diamond-silicon carbide composites is bonded to the barrier layer 166. It should be emphasized that the non-planar barrier layer 166 illustrated in FIG. 9 is merely one suitable configuration, and other barrier-layer configurations may be used to provide a more delamination resistant barrier layer.

Figure 10:
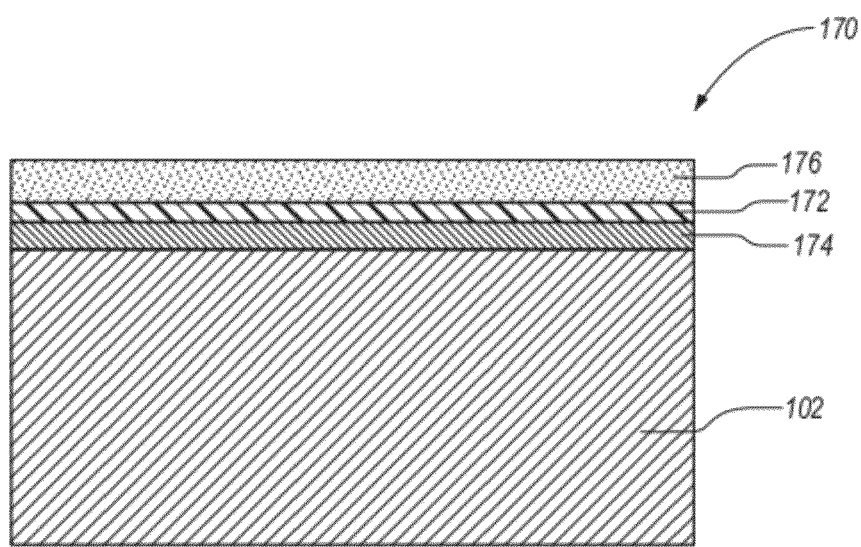
FIG. 10 is a schematic side cross-sectional view of a superabrasive compact including a barrier layer positioned between a superabrasive table comprising diamond-silicon carbide composite and an intermediate PCD table according to another embodiment of the present invention.

FIG. 10 is a schematic side cross-sectional view of a superabrasive compact 170, according to another embodiment of the present invention that also utilizes a barrier layer to help prevent interaction between silicon and metal-solvent catalyst. The superabrasive compact 170 includes a barrier layer 172 disposed between and bonded to an intermediate PCD table 174 and a superabrasive table 176 comprising any of the previously described diamond-silicon carbide composites. The intermediate PCD table 174 is bonded to the substrate 102. The intermediate PCD table 174 comprises bonded diamond grains with interstitial regions between the bonded diamond grains occupied with metal-solvent catalyst (e.g., cobalt) swept-in from the substrate 102 or from another source. In one embodiment of the present invention, the intermediate PCD table 174 may comprise two or more PCD layers, with the concentration of the metal-solvent catalyst within the PCD layer adjacent to the substrate 102 being greater than the concentration of the metal-solvent catalyst within the PCD layer adjacent to the barrier layer 172.

Figure 11:
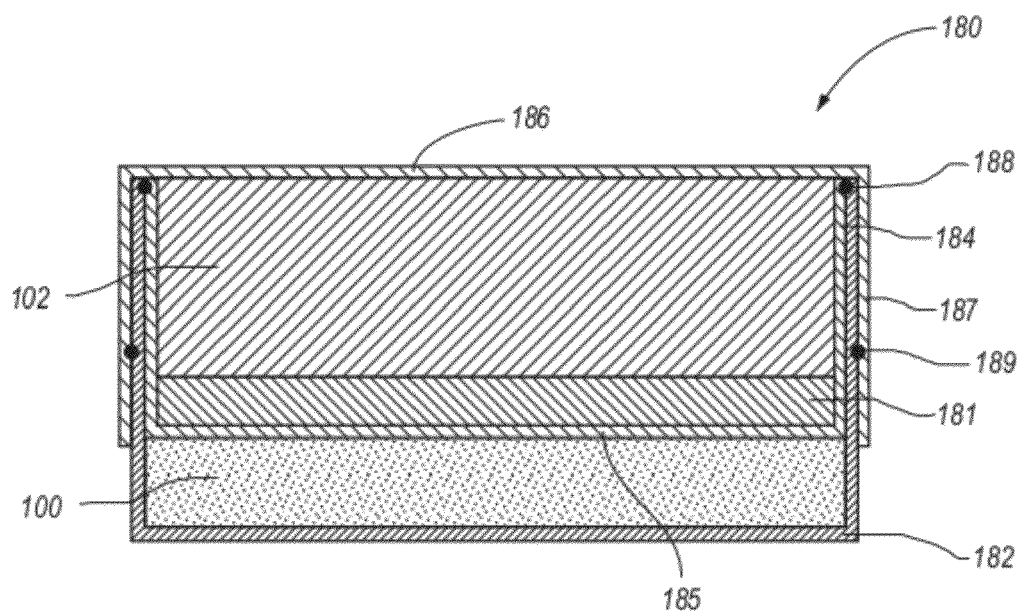
FIG. 11 is a schematic side cross-sectional view of an assembly for forming the superabrasive compact shown in FIG. 10.

FIG. 11 is a schematic side cross-sectional view of an assembly 180, according to one embodiment of the present invention, which may be used to form the superabrasive compact 170 shown in FIG. 10. The assembly 180 includes a first container 182 that receives a particulate mixture 100 comprising any of the previously described diamond-silicon formulations. A second container 184 is received by the first container 182 and also holds a layer of diamond particles 181. Metal-solvent catalyst, such as cobalt, may be mixed with the layer of diamond particles 181. The substrate 102 is also received by the second container 184 and positioned adjacent to the layer of diamond particles 181. The second container 184 includes a barrier portion 185 positioned adjacent to the particulate mixture 100 that helps prevent metal-solvent catalyst from the substrate 102 or, if present, the layer of diamond particles 181 from interacting with silicon in the particulate mixture 100 during HPHT sintering. Accordingly, the second container 184 may be formed from the same materials as the second container 164 shown in FIG. 8. Ultimately, the barrier portion 185 forms the barrier layer 172 shown in FIG. 10 after HPHT sintering. A third container 186 receives the first container 182 and a sidewall 187 thereof extends circumferentially about the first container 182. The first container 182 and the second container 184 may be sealed together with a circumferentially extending bond 188 and the third container 186 and the first container 182 may be sealed together with a circumferentially extending bond 189, as previously described with respect to the assembly 160 shown in FIG. 8. After sealing, and optionally cleaning the particulate mixture 100 using a high-temperature process, the assembly 180 is subjected to HPHT process conditions to sinter various components of the assembly 180 as previously described. After the HPHT process, an abrasive process, such as grit blasting, may be used to remove the first container 182 and the third container 186. Except for the barrier portion 185, all of the second container 184 is also removed by an abrasive process to form the superabrasive compact 170 shown in FIG. 10. Similar to the assembly 160 shown in FIG. 8, the second container 184 may be replaced with a barrier disc positioned between the particulate mixture 100 and the layer of diamond particles 181.

Figure 12:
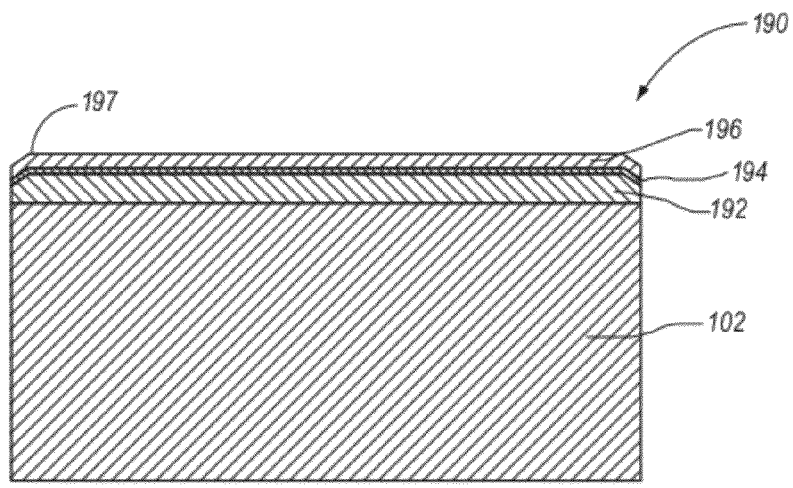
FIG. 12 is a schematic side cross-sectional view of a superabrasive compact including a contoured barrier layer positioned between a superabrasive table comprising diamond-silicon carbide composite and an intermediate PCD table according to another embodiment of the present invention.

The barrier portion 185 of the second container 184 shown in FIG. 11 may be shaped to provide a selected contour to a barrier layer of a HPHT sintered superabrasive compact. By shaping the barrier layer between the intermediate PCD table and the superabrasive table comprising diamond-silicon carbide composite, the volume of the diamond-silicon carbide composite may be reduced, which generally has a lower strength than an underlying PCD table. Thus, the intermediate PCD table may provide a strong core, with a relatively less strong, more thermally-stable superabrasive layer formed over the intermediate PCD table. For example, a superabrasive compact 190, according to one embodiment of the present invention, is shown in FIG. 12. The superabrasive compact 190 includes an intermediate PCD table 192 bonded to the substrate 102, a contoured barrier layer 194 bonded to the PCD table 192, and a superabrasive table 196 comprising any of the previously described diamond-silicon carbide composites bonded to the barrier layer 194. A cutting surface 197 of the superabrasive table 196 may be defined after HPHT sintering using grinding, machining (e.g., electro-discharge machining), or another suitable material removal process.

In addition to shaping the barrier portion 185 of the second container 186 shown in FIG. 11 to provide a contoured barrier layer, the barrier portion 185 may be shaped so that an interface between the barrier layer and the PCD table and an interfacial surface between the barrier layer and a superabrasive table exhibits a selected non-planar topography. A non-planar topography for the barrier layer may provide increased surface area to increase the bond strength between the barrier layer and the PCD table and the superabrasive table. Moreover, a non-planar barrier layer helps break-up internal stresses, thereby reducing the likelihood of delamination of the barrier layer from the intermediate PCD table during fabrication of a superabrasive compact and use.

Figure 13:
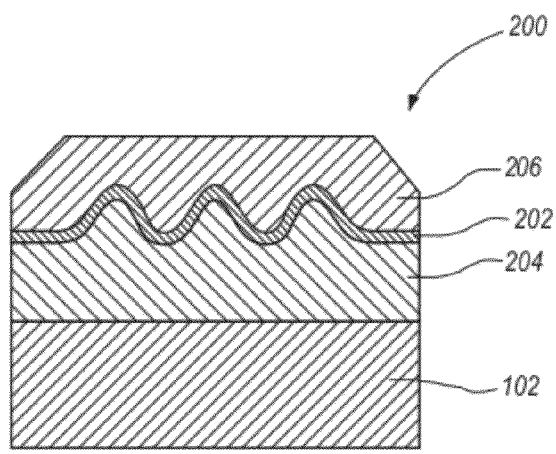
FIG. 13 is a schematic side cross-sectional view of a superabrasive compact including a non-planar barrier layer positioned between a superabrasive table comprising diamond-silicon carbide composite and an intermediate PCD table according to yet another embodiment of the present invention.

FIG. 13 is a schematic side cross-sectional view of a superabrasive compact 200 according to one embodiment of the present invention that utilizes a non-planar barrier layer 202. The non-planar barrier layer 202 is bonded to an intermediate PCD table 204 and a superabrasive table 206 comprising any of the previously described diamond-silicon carbide composites. The non-planar barrier layer 202 is merely one suitable configuration, and other barrier-layer configurations may be used to provide a more delamination resistant barrier layer.

Figure 14:
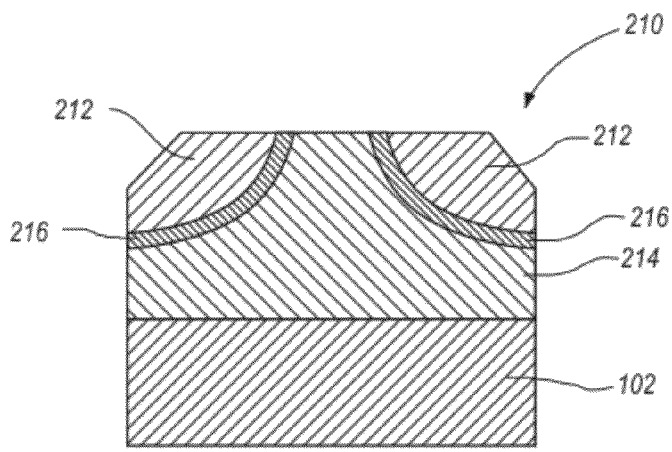
FIG. 14 is a schematic side cross-sectional view of a superabrasive compact including a contoured barrier layer positioned between an annular superabrasive region comprising diamond-silicon carbide composite and an intermediate PCD table according to a further embodiment of the present invention.

FIG. 14 is a schematic side cross-sectional view of a superabrasive compact 210 according to yet another embodiment of the present invention. In the superabrasive compact 210, the superabrasive table may comprise one or more superabrasive regions 212. The superabrasive region 212 may comprise any of the previously described diamond-silicon carbide composites. For example, the superabrasive compact 210 is shown with an annular-shaped superabrasive region 212 that extends circumferentially about an intermediate PCD table 214. A contoured barrier layer 216 is disposed between and bonded to the superabrasive region 212 and the PCD table 214. It should be noted that the PCD table 214 provides a relatively stronger, more fracture resistant core, while the superabrasive region 212 provides a more wear resistant and thermally-stable cutting region.

Figure 15:
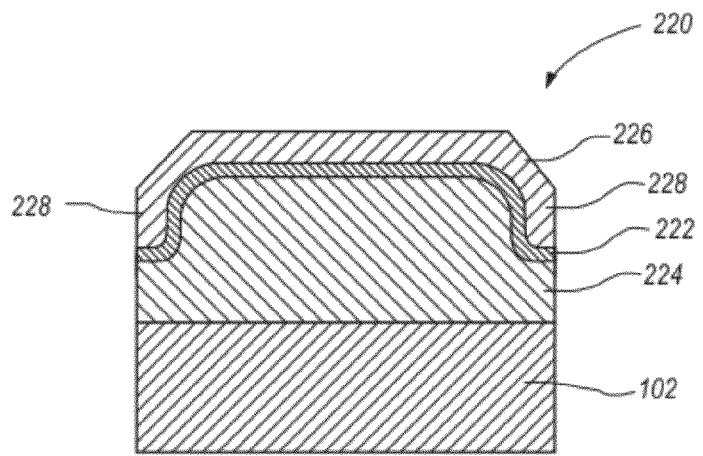
FIG. 15 is a schematic side cross-sectional view of a superabrasive compact including a contoured barrier layer positioned between a superabrasive table comprising diamond-silicon carbide composite and an intermediate PCD table according to yet further embodiment of the present invention.

FIG. 15 is a schematic side cross-sectional view of a superabrasive compact 220 according to an additional embodiment of the present invention. In the superabrasive compact 220, a barrier layer 222 is shaped to contour an intermediate PCD table 224 that is bonded to the substrate 102. A superabrasive table 226 comprising any of the previously described diamond-silicon carbide composites is bonded to the barrier layer 222. In such an embodiment, the superabrasive table 226 is shaped to also contour the barrier layer 222 so that the superabrasive table 226 exhibits substantially vertical side cutting surfaces 228.

In addition to the various embodiments of superabrasive compacts described herein, slugs of the diamond-silicon carbide composite may be fabricated and employed without being bonded to a substrate. For example, according to other embodiments of the present invention, slugs of the diamond-silicon carbide composite may be formed to an appropriate configuration for use as a machining cutting element or for use as a cutting element that is press-fit into a recess of a drill bit body (e.g., a steel bit body) of a rotary drill bit. Other applications for slugs of the diamond-silicon carbide composite include casting the slugs into a matrix-type drill bit body.

Further embodiments of the present invention herein relate to articles of manufacture comprising a body including a layer comprising any diamond-silicon carbide composite disclosed herein bonded to the body via brazing, a HPHT process, or another suitable joining technique. For example, in one embodiment of the present invention, the body may be configured as a medical implement (e.g., a surgical tool like a scalpel) in which the layer comprising diamond-silicon carbide composite provides a wear-resistant, generally inert, and sharpened cutting edge or point. Other medical implements include boring tools and rasps.

Figure 16A:
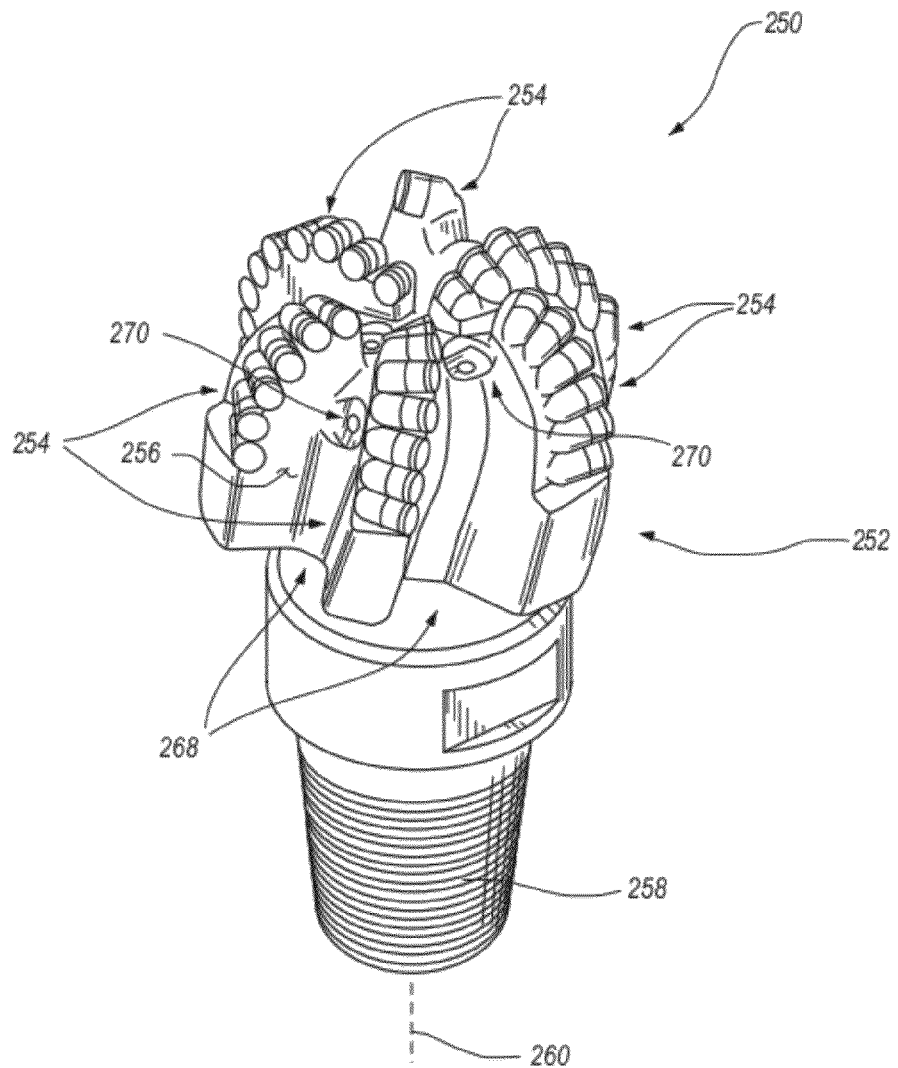
FIG. 16A is an isometric view of one embodiment of a rotary drill bit including at least one superabrasive cutting element including a superabrasive compact configured according any of the various superabrasive compact embodiments of the present invention.
Figure 16B:
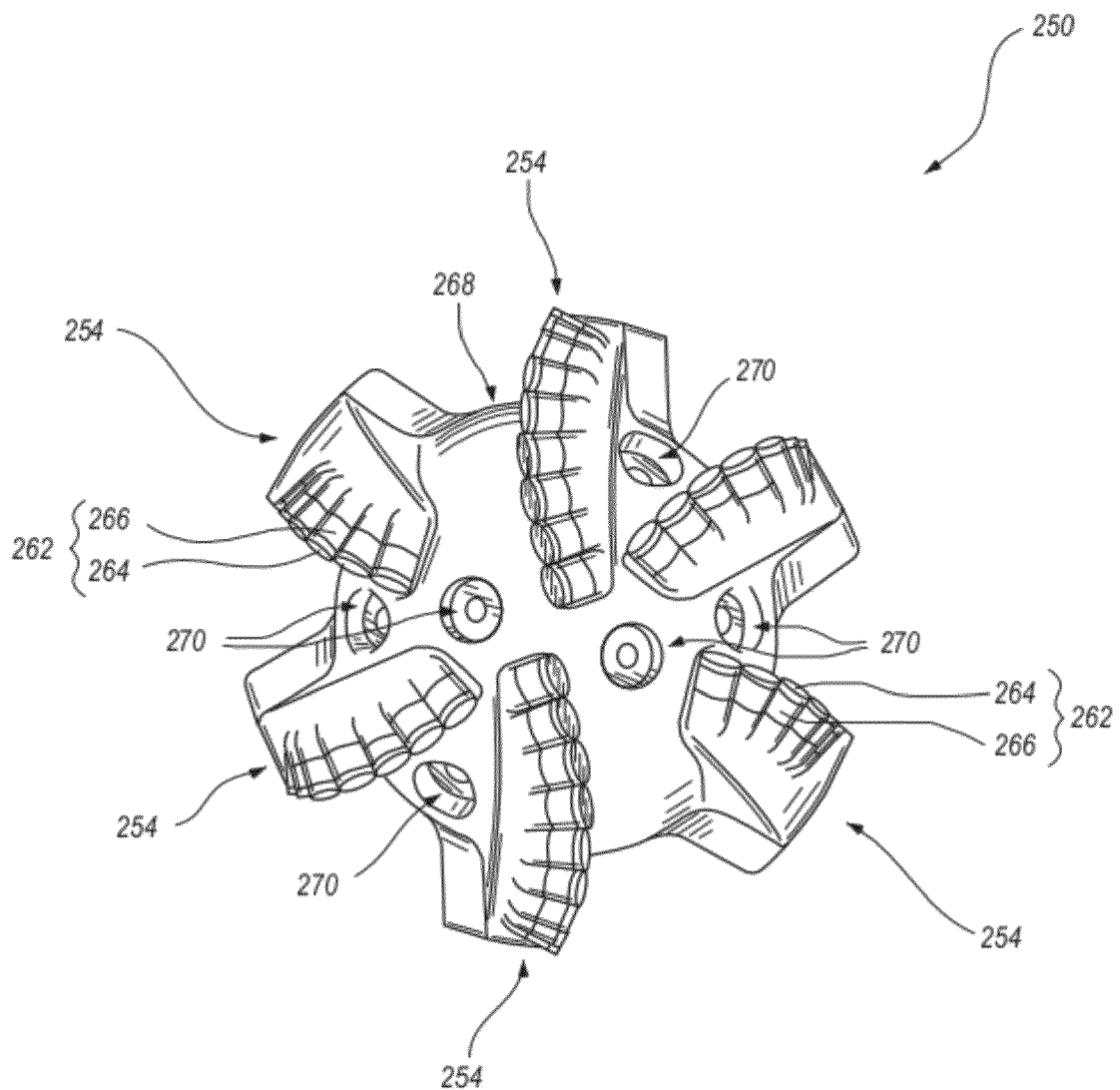
FIG. 16B is a top elevation view of the rotary drill bit of FIG. 16A.

FIG. 16A is an isometric view and FIG. 16B is a top elevation view of a rotary drill bit 250 according to one embodiment of the present invention. The rotary drill bit 250 includes at least one superabrasive cutting element configured according to any of the previously described superabrasive compact embodiments. The rotary drill bit 250 comprises a bit body 252 that includes radially and longitudinally extending blades 254 with leading faces 256, and a threaded pin connection 258 for connecting the bit body 252 to a drilling string. The bit body 252 defines a leading end structure for drilling into a subterranean formation by rotation about a longitudinal axis 260 and application of weight-on-bit.

Still referring to FIGS. 16A and 16B, at least one superabrasive cutting element, configured according to any of the previously described superabrasive compact embodiments, may be affixed to rotary drill bit 250. Referring to FIG. 16B, a plurality of cutting elements 262 are secured to the blades 254. For example, each cutting element 262 may include a superabrasive table 264 (e.g., comprising diamond-silicon carbide composite) bonded to a substrate 266. More generally, the cutting elements 262 may be configured as any of the superabrasive compact embodiments disclosed herein, without limitation. In some embodiments of the present invention, the cutting elements 262 may be formed by separately forming a superabrasive table comprising any diamond-silicon carbide composite disclosed herein (i.e., without a substrate) and affixing the superabrasive table to the bit body 252. For example, structures as previously discussed and disclosed in U.S. patent application Ser. No. 11/899,691 may be employed. In addition, if desired, in some embodiments of the present invention, a number of the cutting elements 262 may be conventional in construction. Also, circumferentially adjacent blades 254 define so-called junk slots 268 therebetween, as known in the art. Additionally, the rotary drill bit 250 includes a plurality of nozzle cavities 270 for communicating drilling fluid from the interior of the rotary drill bit 250 to the cutting elements 262.

FIGS. 16A and 16B merely depict one embodiment of a rotary drill bit that employs at least one cutting element comprising diamond-silicon carbide composite fabricated and structured in accordance with the disclosed embodiments, without limitation. The rotary drill bit 250 may be used to represent any number of earth-boring tools or drilling tools, including, for example, core bits, roller-cone bits, fixed-cutter bits, eccentric bits, bicenter bits, percussion bits, reamers, reamer wings, or any other downhole tool including superabrasive cutting elements or inserts, without limitation.

The diamond-silicon carbide composites and superabrasive compacts disclosed herein may also be utilized in applications other than cutting technology. For example, the disclosed diamond-silicon carbide composites and superabrasive compacts may be used in wire dies, bearings, artificial joints, heart valves, inserts, and heat sinks Any of the diamond-silicon carbide composites and superabrasive compacts disclosed herein may be employed in an article of manufacture including at least one superabrasive element or compact. Thus, the embodiments of diamond-silicon carbide composites and superabrasive compacts disclosed herein may be used on any apparatus or structure in which at least one conventional PCD element or compact is typically used. For example, in one embodiment of the present invention, a rotor and a stator (i.e., a thrust bearing apparatus) may each include a superabrasive element or compact comprising diamond-silicon carbide composite according to any of the embodiments disclosed herein and may be operably assembled to a downhole drilling assembly. U.S. Pat. Nos. 4,410,054; 4,560,014; 5,364,192; 5,368,398; and 5,480,233, the disclosure of each of which is incorporated herein, in its entirety, by this reference, disclose subterranean drilling systems within which bearing apparatuses utilizing diamond-silicon carbide composites and superabrasive compacts disclosed herein may be incorporated.

The embodiments of diamond-silicon carbide composites and superabrasive compacts disclosed herein may also form all or part of heat sinks, wire dies, bearing elements, cutting elements, cutting inserts (e.g., on a roller cone type drill bit), machining inserts, or any other article of manufacture as known in the art. Other examples of articles of manufacture that may use any of the diamond-silicon carbide composites and superabrasive compacts disclosed herein are disclosed in U.S. Pat. Nos. 4,811,801; 4,274,900; 4,268,276; 4,468,138; 4,738,322; 4,913,247; 5,016,718; 5,092,687; 5,120,327; 5,135,061; 5,154,245; 5,460,233; 5,544,713; and 6,793,681, the disclosure of each of which is incorporated herein, in its entirety, by this reference.

Figure 17A:
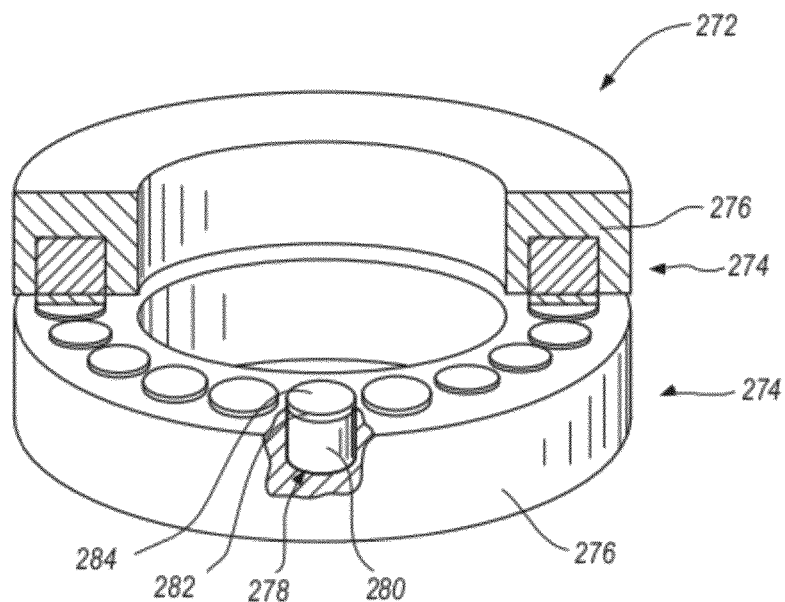
FIG. 17A is an isometric partial cross-sectional view of a thrust-bearing apparatus according to one embodiment of the present invention, which may utilize any of the disclosed superabrasive compact embodiments as bearing elements.

FIG. 17A is an isometric partial cross-sectional view of a thrust-bearing apparatus 272 according to one embodiment of the present invention, which may utilize any of the disclosed superabrasive compact embodiments as bearing elements. The thrust-bearing apparatus 272 includes respective bearing assemblies 274. Each bearing assembly 274 includes a support ring 276 that may be fabricated from a material, such as steel, stainless steel, or another suitable material. Each support ring 276 includes a plurality of recesses (not labeled) that receives a corresponding bearing element 278. Each bearing element 278 may be mounted to a corresponding support ring 276 within a corresponding recess by brazing, press-fitting, using fasteners, or another suitable mounting technique. One or more, or all of bearing elements 278 may be configured according to any of the disclosed superabrasive compact embodiments. For example, each bearing element 278 may include a substrate 280 and a superabrasive table 282 comprising diamond-silicon carbide composite, with the superabrasive table 282 including a bearing surface 284.

In use, the bearing surfaces 284 of one of the bearing assemblies 274 bears against the opposing bearing surfaces 284 of the other one of the bearing assemblies 274. For example, one of the bearing assemblies 274 may be operably coupled to a shaft to rotate therewith and may be termed a "rotor." The other one of the bearing assemblies 274 may be held stationary and may be termed a "stator."

Figure 17B:
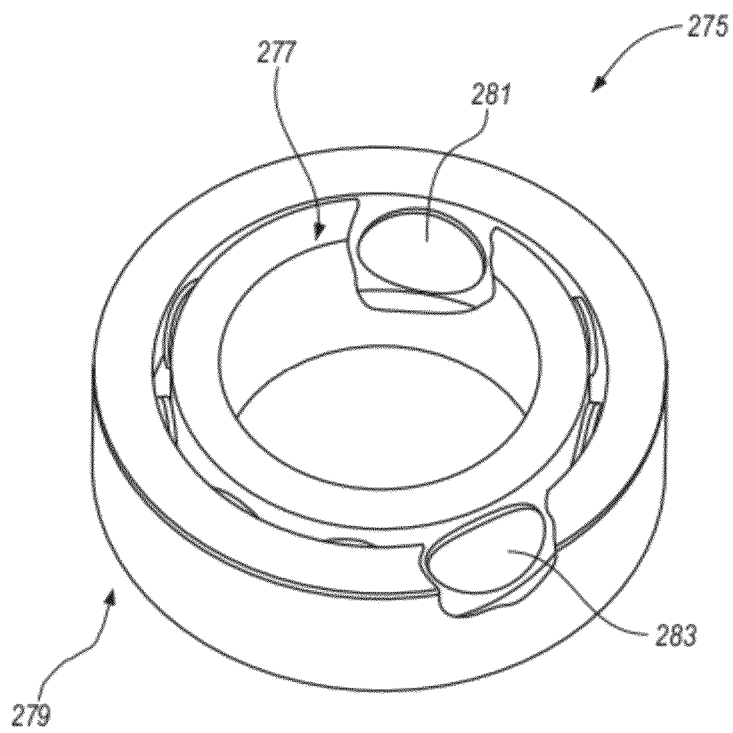
FIG. 17B is an isometric partial cross-sectional view of a radial bearing apparatus according to one embodiment of the present invention, which may utilize any of the disclosed superabrasive compact embodiments as bearing elements.

FIG. 17B is an isometric view of a radial bearing apparatus 275 according to another embodiment of the present invention, which may utilize any of the disclosed superabrasive compact embodiments as bearing elements. The radial bearing apparatus 275 includes an inner race 277 positioned generally within an outer race 279. The outer race 279 includes a plurality of bearing elements 281 affixed thereto and an inner race 277 also includes a plurality of bearing elements 283 affixed thereto. One or more, or all of the bearing elements 281 and 283 may be configured according to any of the superabrasive compact embodiments disclosed herein. The inner race 277 is positioned generally within the outer race 279. Thus, inner race 277 and outer race 279 may be configured so that the bearing surfaces (collectively defined by the respective bearing elements 283 affixed to the inner race 277 and the respective bearing elements 281 affixed to the outer race 279) may at least partially contact one another and move relative to each other as the inner race 277 and outer race 279 rotate relative to each other during use.

Figure 17C:
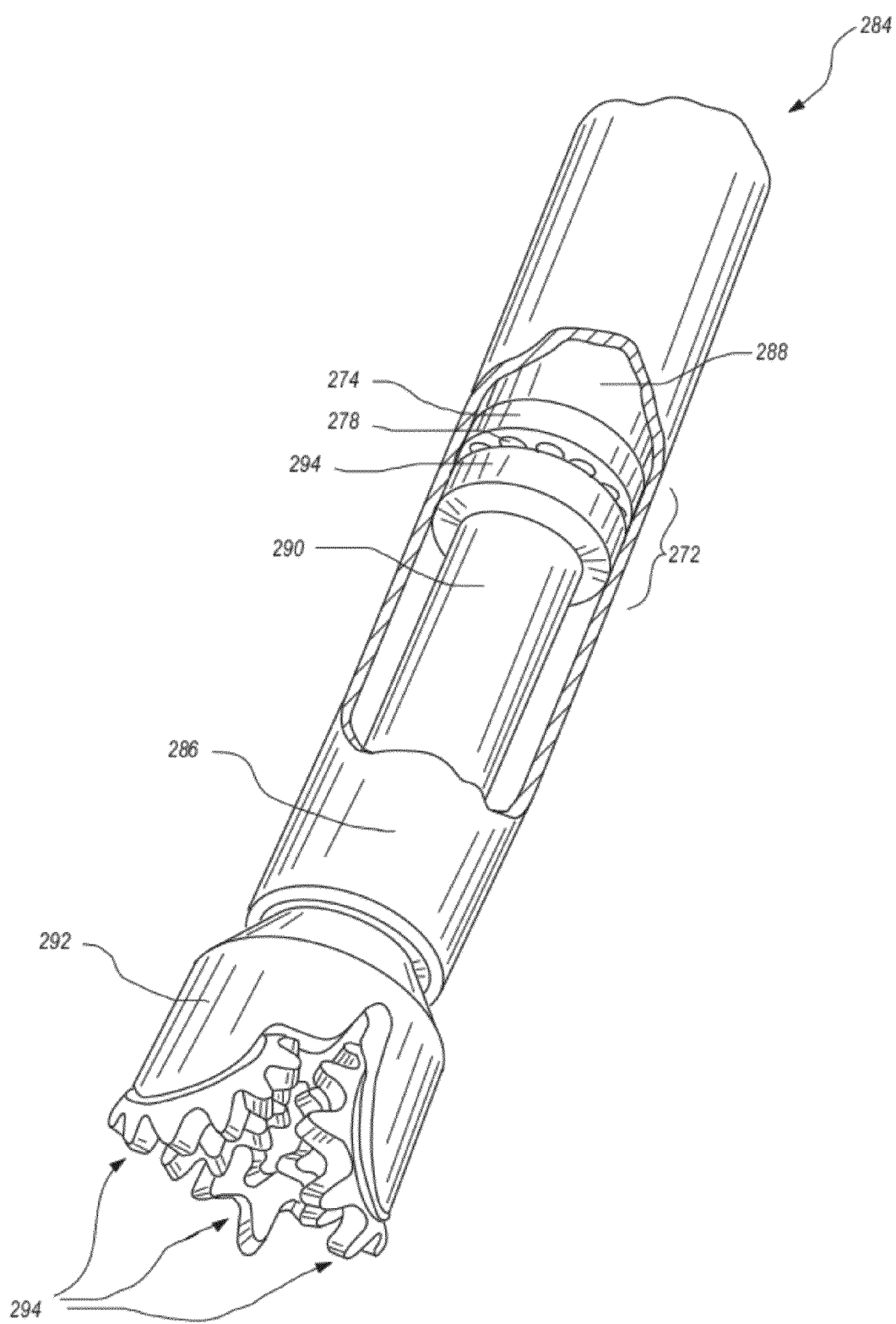
FIG. 17C is a schematic isometric partial cross-sectional view of a subterranean drilling system including the thrust-bearing apparatus shown in FIG. 17A according to another embodiment of the present invention.

Referring to FIG. 17C, the thrust-bearing apparatus 272 and/or radial bearing apparatus 275 may be incorporated in a subterranean drilling system. FIG. 17C is a schematic isometric partial cross-sectional view of a subterranean drilling system 284 that includes the thrust-bearing apparatus 272 shown in FIG. 17A according to another embodiment of the present invention. The subterranean drilling system 284 includes a housing 286 enclosing a downhole drilling motor 288 (i.e., a motor, turbine, or any other device capable of rotating an output shaft) that is operably connected to an output shaft 290. The thrust-bearing apparatus 272 shown in FIG. 17A is operably coupled to the downhole drilling motor 288. A rotary drill bit 292 configured to engage a subterranean formation and drill a borehole is connected to the output shaft 290. The rotary drill bit 292 is shown as a roller cone bit including a plurality of roller cones 294. However, other embodiments of the present invention may utilize different types of rotary drill bits, such as so-called "fixed cutter" drill bits. As the borehole is drilled, pipe sections may be connected to the subterranean drilling system 284 to form a drill string capable of progressively drilling the borehole to a greater depth within the earth.

One of the thrust-bearing assemblies 274 of the thrust-bearing apparatus 272 is configured as a stator that does not rotate and the other one of the thrust-bearing assemblies 274 is configured as a rotor that is attached to the output shaft 290 and rotates with the output shaft 290.

In operation, drilling fluid may be circulated through the downhole drilling motor 288 to generate torque and effect rotation of the output shaft 290 and the rotary drill bit 292 attached thereto so that a borehole may be drilled. A portion of the drilling fluid may also be used to lubricate opposing bearing surfaces of the bearing elements 278 of the thrust-bearing assemblies 274.

The following working examples of the present invention set forth various formulations for forming diamond-silicon carbide composites, cutting elements, and superabrasive compacts including a table comprising diamond-silicon carbide composite. The following working examples provide further detail in connection with the specific embodiments described above.

EXAMPLE 1

A mixture comprising about 79 weight percent diamond particles with a particle size of about 30 μm to about 40 μm, about 5 weight percent diamond particles with an average particle size of about 0.1 μm (100 nm), and about 16 weight percent crystalline silicon particles with an average particle size of about 35 μm was loaded into a tungsten carbide milling jar and purged with argon gas. Then, the mixture was mixed in a Spex 8000D mixer/mill milling apparatus using tungsten carbide balls for about 24 hours. X-ray diffraction analysis of the milled mixture confirmed that during the milling process, the silicon particles gradually transformed from crystalline silicon to amorphous silicon due to introduction of defects from the milling of the silicon particles in the presence of diamond particles. Particle size analysis showed that the particle size of the diamond particles was reduced due to the milling process. The particle size of the diamond particles after milling ranged from about 40 nm to about 40 μm, and the milled diamond particles were coated with a thin layer of amorphous silicon.

The milled mixture was placed in a boron nitride capsule, cleaned using a high-temperature vacuum process, and vacuum sealed. The capsule, including the milled mixture, was placed in the reaction zone of a conventional high-temperature, high-pressure apparatus and subjected to a temperature of about 1400° Celsius and a pressure of about 60 kilobar for about 6 minutes to sinter the milled mixture and form a diamond-silicon carbide composite. X-ray diffraction analysis showed that the major phases present in the diamond-silicon carbide composite were about 75 volume percent diamond and about 25 volume percent silicon carbide.

Figure 18:
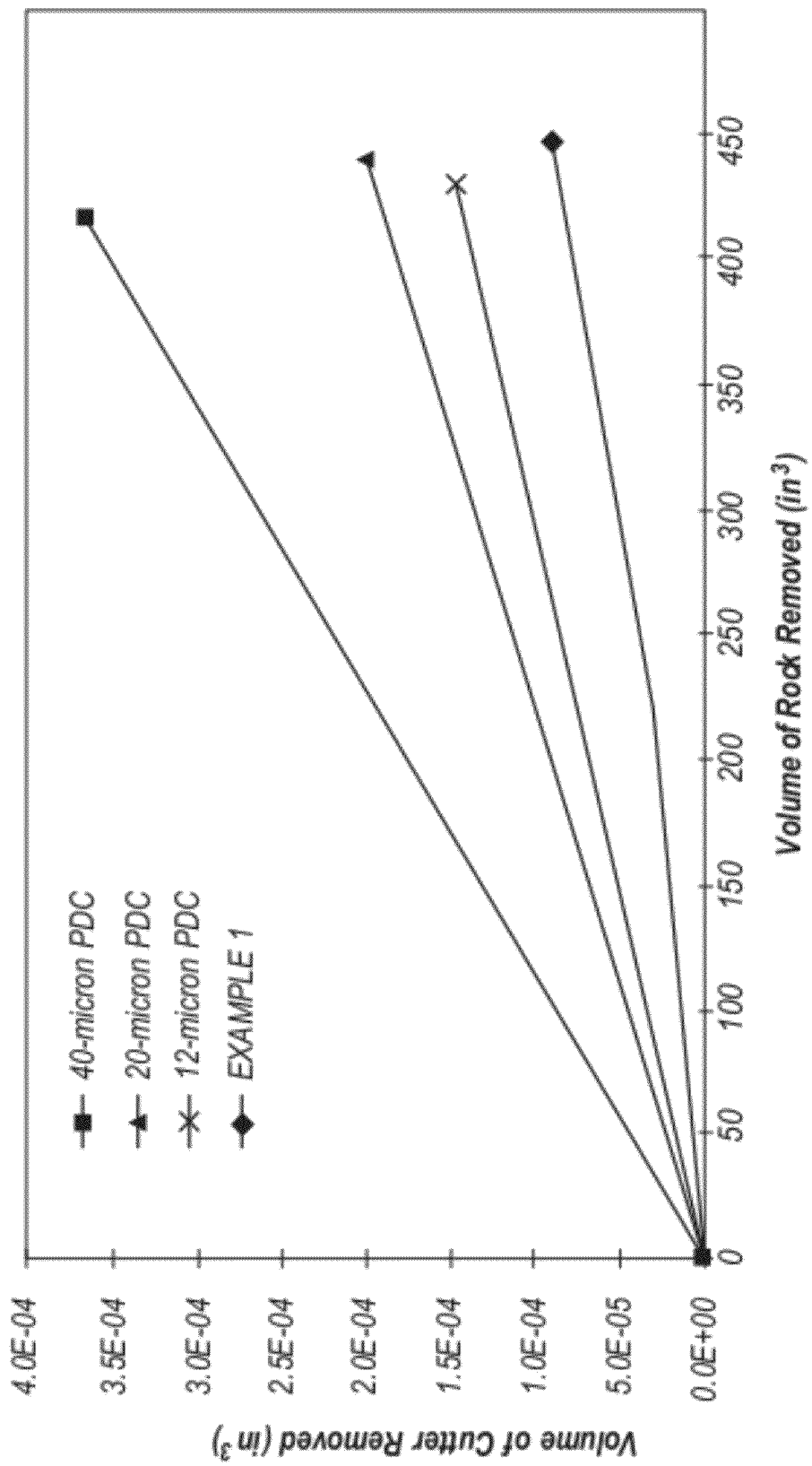
FIG. 18 is a graph illustrating wear characteristics as a function of rock volume cut for various conventional PDCs and a cutting element fabricated according to example 1 of the present invention.

The diamond-silicon carbide composite so-formed was machined into a cylindrical cutting element with a diameter of about 13 mm and a length of about 13 mm for wear and thermal stability testing. The wear resistance of the diamond-silicon carbide composite of example 1 was compared to several conventional PDC formed from different diamond particle formulations exhibiting different average particle sizes (12 μm, 20 μm, and 40 μm). The wear resistance was evaluated by measuring the volume of the cutting element removed versus the volume of Sierra White Granite rock removed in a vertical turret lathe at a 0.010 inch depth of cut and 100 RPM, with water used as a coolant. As shown in FIG. 18, the cutting element of example 1 exhibited significantly less wear when compared to the conventional PDCs.

The thermal stability of the diamond-silicon carbide composite of example 1 was evaluated by measuring the distance cut in a Sierra White Granite workpiece in a vertical turret lathe at a 0.110 inch depth of cut and 100 RPM, without using coolant. The cutting element of example 1 was able to cut a distance approximately 7.8 times greater than a conventional, fine grain, PDC prior to thermal failure. The diamond table of the conventional PDC used in the thermal stability tests was leached to a depth of about 70 μm to remove nearly all of the cobalt from a region of the diamond table. Thus, the cutting element of example 1 exhibited a significantly greater thermal stability than the conventional, fine grain, PDC.

EXAMPLE 2

A mixture comprising about 79 weight percent diamond particles with a particle size of about 30 μm to about 40 μm, about 5 weight percent diamond particles with an average particle size of about 0.1 μm (100 nm), and about 16 weight percent crystalline silicon particles with an average particle size of about 35 μm was loaded into a tungsten carbide milling jar and purged with argon gas. Then, the mixture was mixed in a Spex 8000D mixing/milling apparatus using tungsten carbide balls for about 8 hours. The milled mixture was placed in a niobium capsule, cleaned using a high-temperature vacuum process, and vacuum sealed. The capsule, including the milled mixture, was placed in the reaction zone of a conventional high-temperature, high-pressure apparatus and subjected to a temperature of about 1400° Celsius and a pressure of about 60 kilobar for about 6 minutes to sinter the milled mixture and form a diamond-silicon carbide composite. X-ray diffraction analysis showed that the major phases present in the diamond-silicon carbide composite were diamond and silicon carbide. The diamond-silicon carbide composite so-formed was machined into a cylindrical cutting element with a diameter of about 13 mm and a length of about 8 mm for wear and thermal stability testing.

Figure 19:
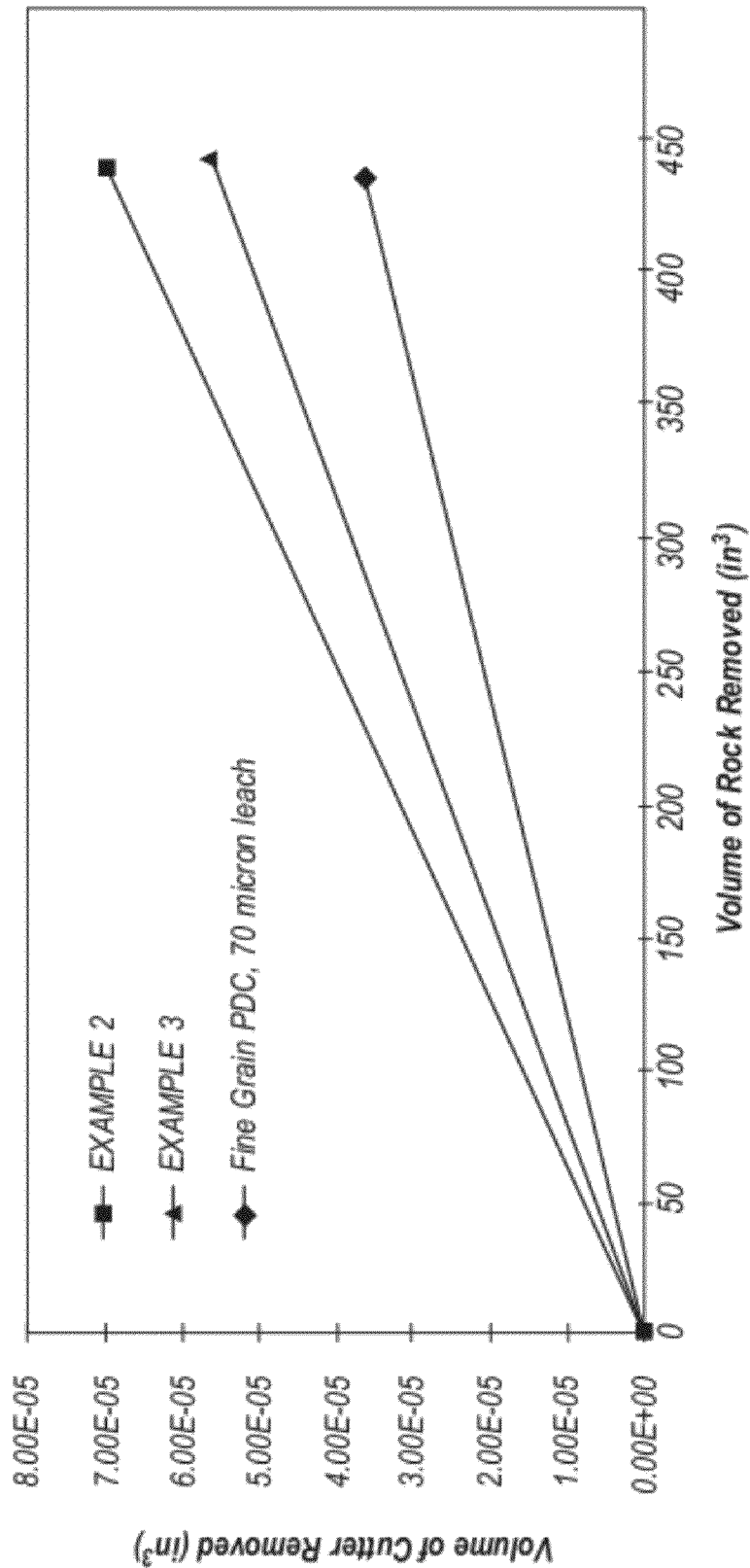
FIG. 19 is a graph illustrating wear characteristics as a function of rock volume cut for a conventional, fine grain, leached PDC and a cutting element fabricated according to example 2 of the present invention and a superabrasive compact fabricated according to example 3 of the present invention.

As shown in FIG. 19, the cutting element of example 2 exhibited wear resistance similar to a conventional, fine grain, PDC. The diamond table of the conventional PDC used in the wear resistance test was leached to a depth of about 70 μm to remove nearly all of the cobalt from a region of the diamond table. The thermal stability of the cutting element of example 2 was evaluated by measuring the distance cut in a Sierra White Granite workpiece in a vertical turret lathe at a 0.110 inch depth of cut and 100 RPM, with without using coolant. The cutting element of example 2 was able to cut a distance approximately 23 times greater than that of a conventional, fine grain, PDC similar to the conventional PDC used in the wear resistance tests of example 1. Thus, the cutting element of example 2 exhibited a significantly greater thermal stability than the conventional, fine grain, PDC.

EXAMPLE 3

A first layer comprising about 1 gram of the milled mixture of diamond particles and silicon previously described in example 2 was distributed in the bottom of a niobium capsule. A second layer comprising about 1 gram of diamond particles with a particle size range of about 15 µm to about 25 µm was layered over the first layer. A cobalt-cemented tungsten carbide substrate was placed over the second layer of diamond particles. Then, the niobium capsule including the first layer, second layer, and substrate was cleaned using a high-temperature vacuum process and vacuum sealed. The niobium capsule, including the first layer, second layer, and substrate, was placed in the reaction zone of a conventional high-temperature, high-pressure apparatus and subjected to a temperature of about 1400° Celsius and a pressure of about 60 kilobar for about 6 minutes to bond the various layers together and bond the second layer to the substrate. The superabrasive compact so-formed included a table of diamond-silicon carbide composite defining a cutting region, a cobalt-cemented tungsten carbide substrate, and an intermediate polycrystalline diamond table sintered with cobalt swept in from the substrate that is bonded to the substrate and the table of diamond-silicon carbide composite.

The superabrasive compact so-formed was machined to a diameter of about 16 mm and a length of about 8 mm for wear and thermal stability testing. The wear resistance of the superabrasive compact of example 3 was also evaluated by measuring the volume of the cutting element removed versus the volume of Sierra White Granite rock removed in a vertical turret lathe at a 0.010 inch depth of cut and 100 RPM, with water used as a coolant. As shown in FIG. 19, the superabrasive compact of example 3 exhibited wear resistance similar to the conventional, fine grain, PDC previously described in example 1. The thermal stability of the superabrasive compact of example 3 was also evaluated by measuring the distance cut in a Sierra White Granite workpiece in a vertical turret lathe at a 0.110 inch depth of cut and 100 RPM, without using coolant. The superabrasive compact of example 3 was able to cut a distance approximately 7 times greater than that of a conventional, fine grain, PDC similar to the conventional PDC previously described in example 1. Thus, the superabrasive compact of example 3 exhibited a significantly greater thermal stability than the conventional, fine grain, PDC.

EXAMPLE 4

A mixture comprising about 83 weight percent diamond particles with a particle size of about 30 µm to about 40 µm, about 3 weight percent diamond particles with an average particle size of about 0.1 µm (100 nm), and about 14 weight percent crystalline silicon particles with an average particle size of about 35 µm was loaded into a tungsten carbide milling jar and purged with argon gas. The mixture was then mixed in a Spex 8000D mixing/milling apparatus using tungsten carbide balls for about 1.67 hours.

A first layer comprising about 1 gram of the milled mixture was distributed in the bottom of a niobium capsule. A second layer comprising about 1 gram of diamond particles with a particle size of about 15 µm to about 25 µm was layered over the first layer. A cobalt-cemented tungsten carbide substrate was placed over the second layer of diamond particles. The niobium capsule including the first layer, second layer, and substrate was cleaned using a high-temperature vacuum process and vacuum sealed. Then, the niobium capsule, including the first layer, second layer, and substrate, was placed in the reaction zone of a conventional high-temperature, high-pressure apparatus and subjected to a temperature of about 1400° Celsius and a pressure of about 60 kilobar for about 6 minutes to bond the various layers together and bond the second layer to the substrate. The superabrasive compact so-formed included a table of diamond-silicon carbide composite defining a cutting region, a cobalt-cemented tungsten carbide substrate, and an intermediate polycrystalline diamond table sintered with cobalt swept in from the substrate that is bonded to the substrate and the table of diamond-silicon carbide composite.

Figure 20:
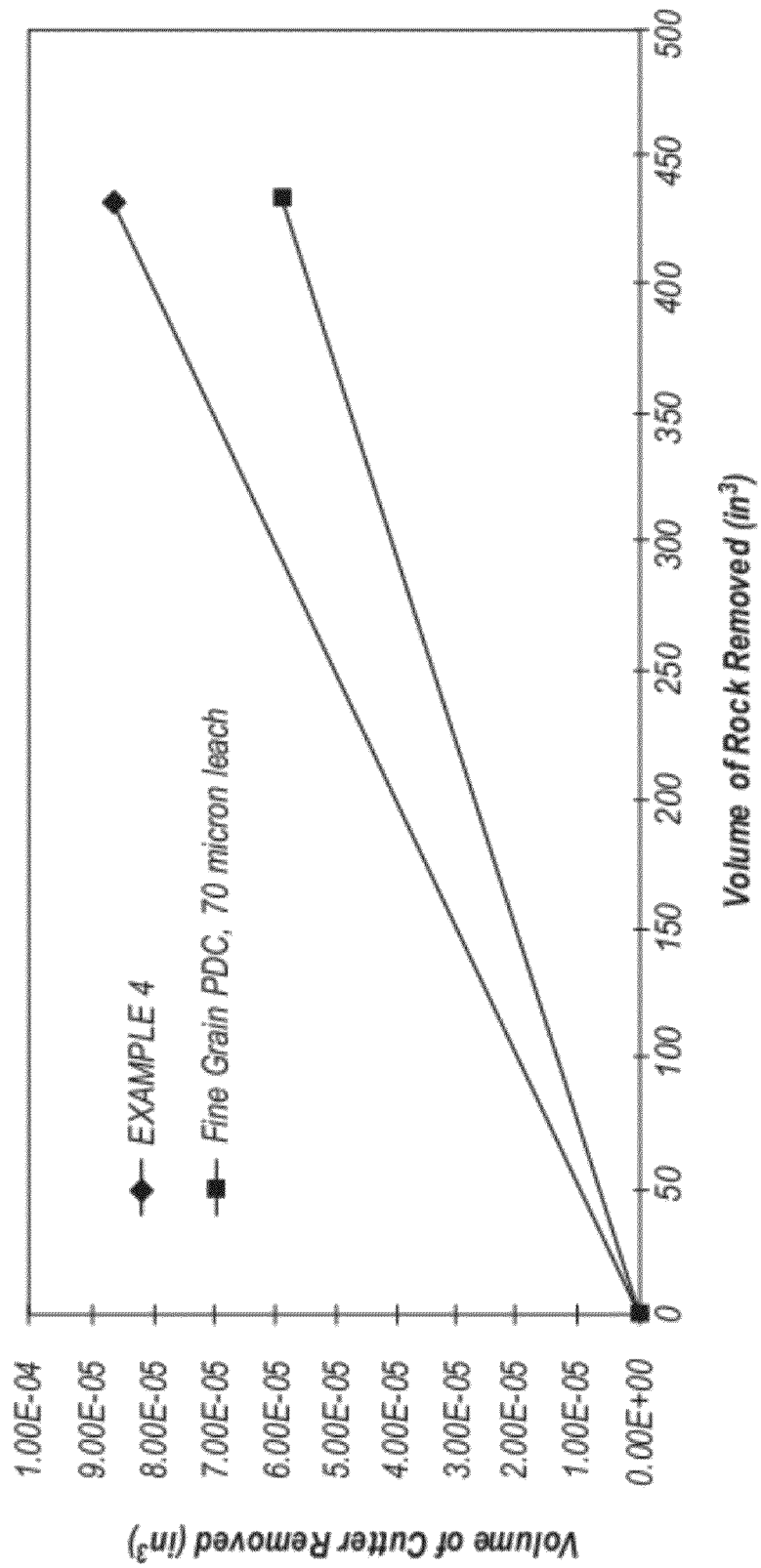
FIG. 20 is a graph illustrating wear characteristics as a function of rock volume cut for a conventional, relatively, fine grain, leached PDC and a superabrasive compact fabricated according to example 4 of the present invention.

The superabrasive compact so-formed was machined to a diameter of about 16 mm and a length of about 13 mm for wear and thermal stability testing. The wear resistance of the superabrasive compact of example 4 was also evaluated by measuring the volume of the cutting element removed versus the volume of Sierra White Granite rock removed in a vertical turret lathe at a 0.010 inch depth of cut and 100 RPM, with water used as a coolant. As shown in FIG. 20, the superabrasive compact of example 4 exhibited wear resistance similar to the conventional, fine grain, PDC described above in example 1. The thermal stability of the superabrasive compact of example 4 was also evaluated by measuring the distance cut in a Sierra White Granite workpiece in a vertical turret lathe at a 0.110 inch depth of cut and 100 RPM, without using coolant. The superabrasive compact of example 4 was able to cut a distance approximately 12 times greater than that of a conventional, fine grain, PDC similar to the conventional PDC described above in example 1. Thus, the superabrasive compact of example 4 exhibited a significantly greater thermal stability than the conventional, fine grain, PDC.

Drop-weight tests also indicated that the table of diamond-silicon carbide composite of the superabrasive compact of example 4 exhibited an impact resistance similar to the conventional, fine grain, PDC used in the wear resistance and thermal stability tests of example 2-4.

EXAMPLE 5

A mixture comprising about 85 weight percent diamond particles with a particle size of about 15 µm to about 25 µm, about 5 weight percent diamond particles with an average particle size of about 1 µm to about 3 µm, and about 10 weight percent crystalline silicon particles with an average particle size of about 35 µm was loaded into a tungsten carbide lined milling jar and purged with argon gas. The mixture was then mixed in a Spex 8000D mixing/milling apparatus using tungsten carbide balls for about 1.67 hours.

A layer comprising about 2 grams of the milled mixture was distributed in the bottom of a niobium capsule. A cobalt-cemented tungsten carbide substrate was placed over the layer of the milled mixture, with a planar interfacial surface of the substrate positioned adjacent to the layer. The niobium capsule, including the layer of the milled mixture and substrate, was cleaned using a high-temperature vacuum process and vacuum sealed. Then, the niobium capsule, including the layer of the milled mixture and substrate, was placed in the reaction zone of a conventional high-temperature, high-pressure apparatus and subjected to a temperature of about 1400° Celsius and a pressure of about 60 kilobar for about 6 minutes.

The superabrasive compact so-formed was machined to a diameter of about 16 mm and a length of about 13 mm for wear and thermal stability testing. Microstructural analysis was performed using a scanning electron microscope and various photomicrographs are shown in FIGS. 21A-21D. FIG. 21A shows a low magnification image of the superabrasive compact illustrating the overall structure of the superabrasive compact. The superabrasive compact includes a superabrasive table 300 bonded to the substrate 302. The superabrasive table 300 includes at least two regions: an upper region 304 comprising diamond-silicon carbide composite and a lower region 306 bonded to the substrate that includes cobalt swept-in from the substrate. FIG. 21B shows the microstructure of the upper region 304 of the superabrasive table 300. The upper region 304 includes diamond grains (dark angular features) bonded together by a matrix (lighter region). The matrix is currently believed by the inventors to be silicon carbide and some un-reacted silicon. FIG. 21C shows the microstructure of the lower region 306 of the superabrasive table 300. The lower region 306 includes diamond grains (dark angular features) bonded together by a matrix (lighter region). The matrix of the lower region 306 is currently believed by the inventors to include cobalt swept-in from the substrate, silicon carbide, and various cobalt silicides (e.g., $Co_2Si$, $CoSi$, and $CoSi_2$). Carbon precipitates may also be present in the matrix of the lower region 306. FIG. 21D shows the microstructure proximate the interface between the upper region 304 and the lower region 306, which clearly shows the transition from the lower region 306 to the upper region 304 of the superabrasive table 300. The infiltration of cobalt into the upper region 304 is currently believed by the inventors to be prevented due to the formation of silicon carbide in the matrix of the upper region 304. In both the upper region 304 and the lower region 306, the photomicrographs of FIGS. 21B-21D show a lack of bonding between the diamond grains. The lower region 306 of the superabrasive table 300 even showed a lack of bonding between diamond grains despite the presence of cobalt, which is a metal-solvent catalyst.

Figure 22:
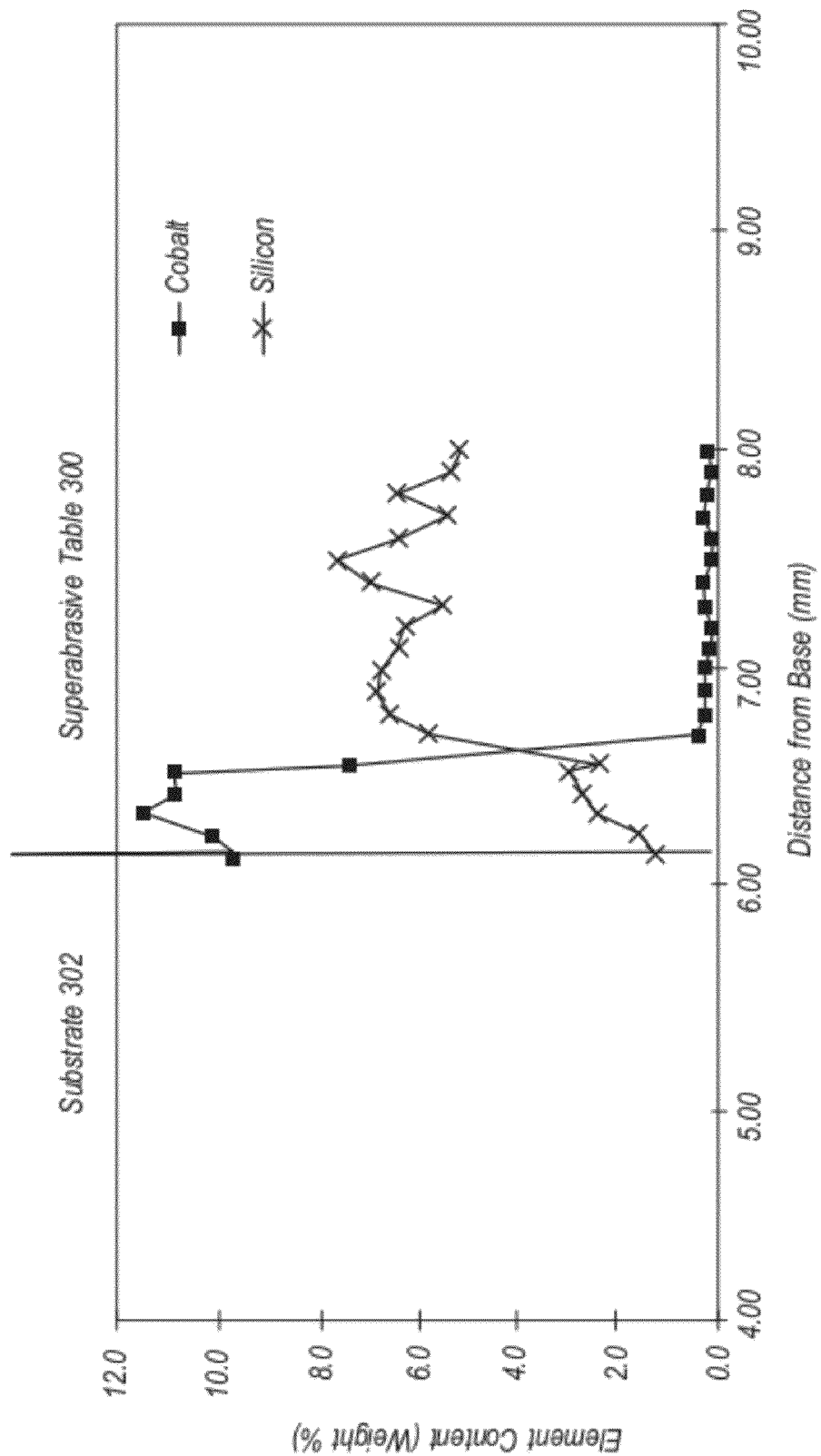
FIG. 22 is graph of the silicon and cobalt concentrations in the superabrasive table shown in FIG. 21A.

Elemental analysis was performed on the superabrasive compact using energy-dispersive spectroscopy ("EDS"). FIG. 22 shows the concentration of cobalt and silicon in weight percentage present in the superabrasive table 300. As shown in FIG. 22, the concentration of cobalt drops to approximately zero at or near the interface between the upper region 304 and the lower region 306 of the superabrasive table 300. Silicon is present in both the upper region 304 and the lower region 306 of the superabrasive table 300.

Figure 23:
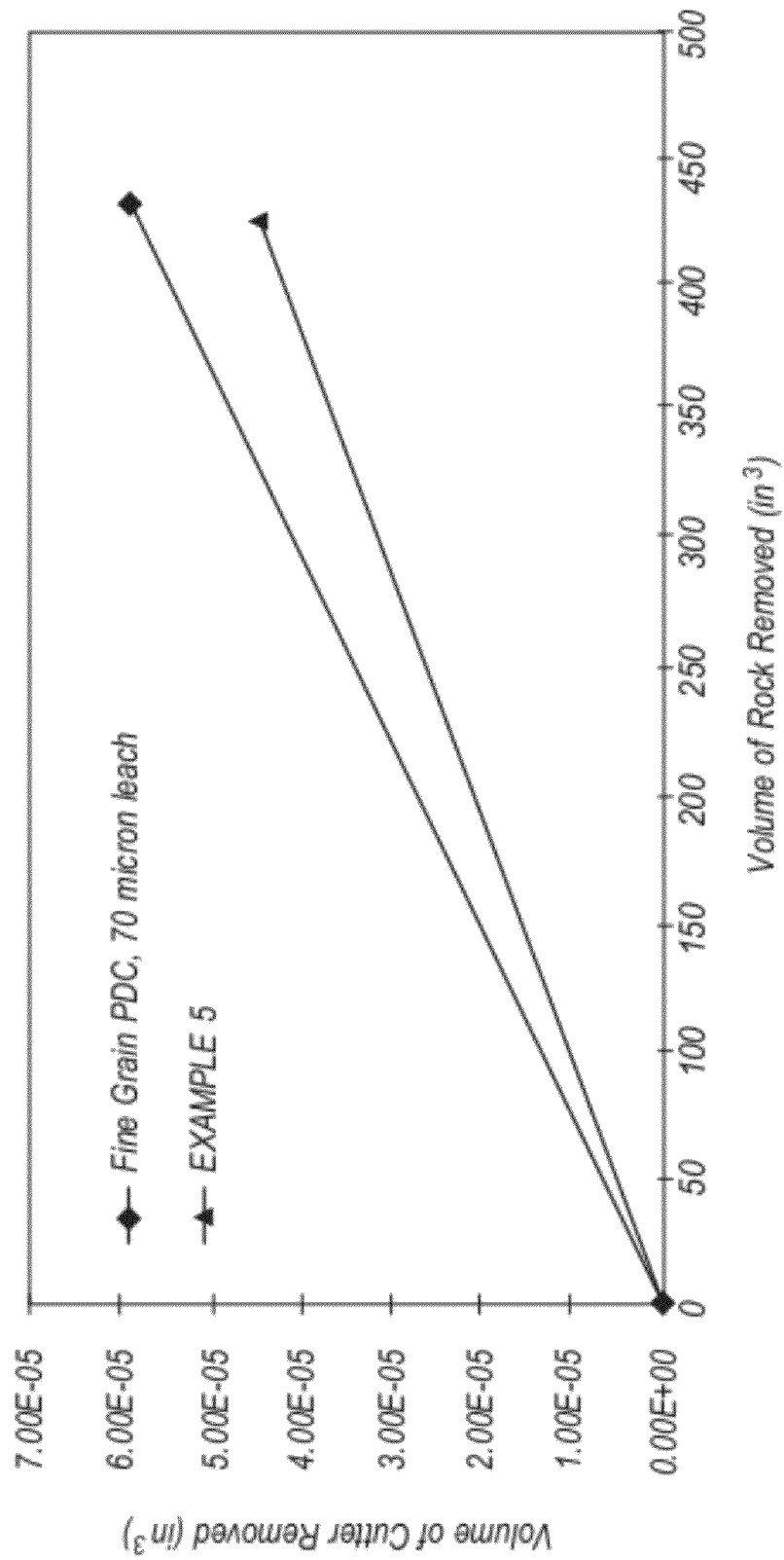
FIG. 23 is a graph illustrating wear characteristics as a function of rock volume cut for a conventional, relatively, fine grain, leached PDC and a superabrasive compact fabricated according to example 5 of the present invention.

The wear resistance of the superabrasive compact of example 5 was also evaluated by measuring the volume of the cutting element removed versus the volume of Sierra White Granite rock removed in a vertical turret lathe at a 0.010 inch depth of cut and 100 RPM, with water used as a coolant. As shown in FIG. 23, the superabrasive compact of example 5 exhibited wear resistance similar to the conventional, fine grain, PDC described above in example 1. The thermal stability of the superabrasive compact of example 5 was also evaluated by measuring the distance cut in a Sierra White Granite workpiece in a vertical turret lathe at a 0.110 inch depth of cut and 100 RPM, without using coolant. The superabrasive compact of example 5 was able to cut a distance approximately 13 times greater than that of a conventional, fine grain, PDC similar to the conventional PDC described above in example 1. Thus, the superabrasive compact of example 5 exhibited a significantly greater thermal stability than the conventional, fine grain, PDC.

EXAMPLE 6

A mixture comprising about 90 weight percent diamond particles with a particle size of about 15 µm to about 25 µm, about 5 weight percent diamond particles with an average particle size of about 1 µm to about 3 µm, and about 5 weight percent crystalline silicon particles with an average particle size of about 35 µm was loaded into a tungsten carbide lined milling jar and purged with argon gas. The mixture was then mixed in a Spex 8000D mixing/milling apparatus using tungsten carbide balls for about 1.67 hours.

A layer comprising about 2 grams of the milled mixture was distributed in the bottom of a niobium capsule. A cobalt-cemented tungsten carbide substrate was placed over the layer of the milled mixture, with a planar interfacial surface of the substrate positioned adjacent to the layer. The niobium capsule, including the layer of the milled mixture and substrate, was cleaned using a high-temperature vacuum process and vacuum sealed. Then, the niobium capsule, including the layer of the milled mixture and substrate, was placed in the reaction zone of a conventional high-temperature, high-pressure apparatus and subjected to a temperature of about 1400° Celsius and a pressure of about 60 kilobar for about 6 minutes.

Figure 24B:
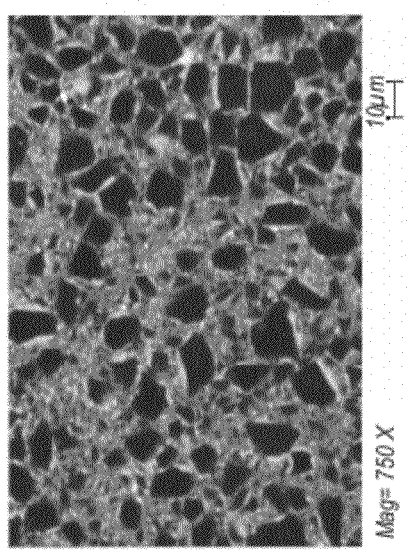
FIG. 24B is a photomicrograph taken using a scanning electron microscope showing the microstructure of an upper region of the superabrasive table shown in FIG. 24A.
Figure 24D:
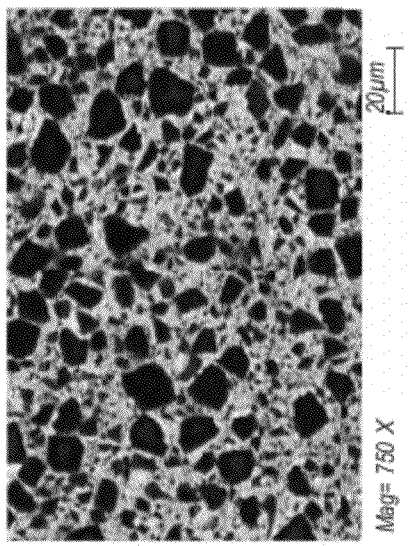
FIG. 24D is a photomicrograph taken using a scanning electron microscope showing the microstructure of the superabrasive table shown in FIG. 24A proximate a transition region between the upper and lower regions.
Figure 24C:
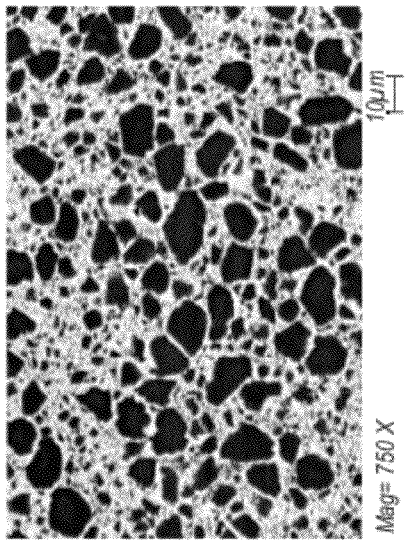
FIG. 24C is a photomicrograph taken using a scanning electron microscope showing the microstructure of a lower region of the superabrasive table shown in FIG. 24A.
Figure 24A:
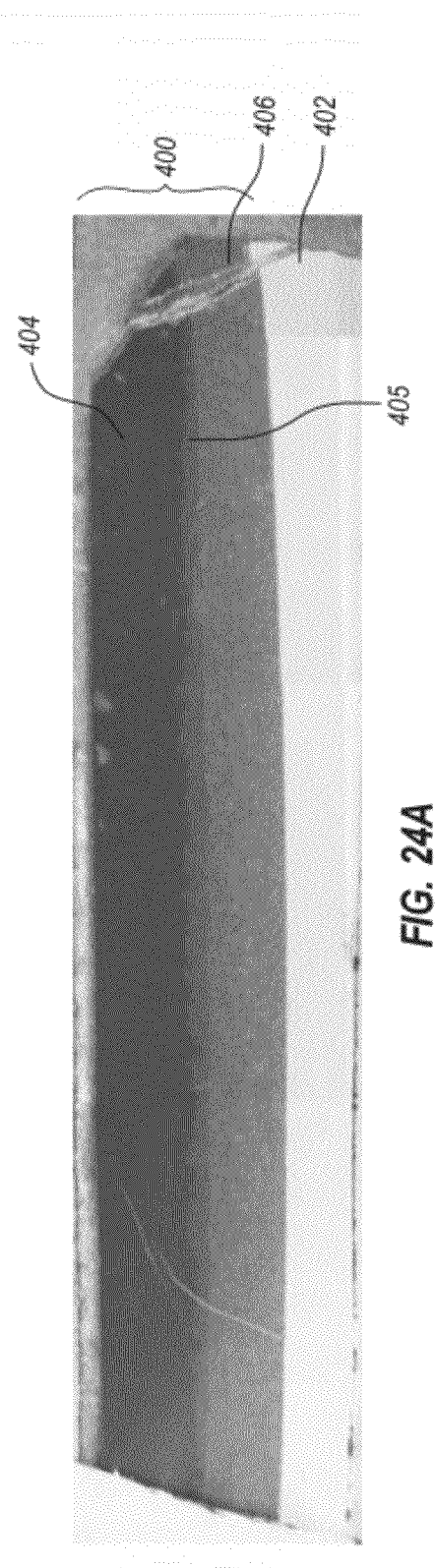
FIG. 24A is a low magnification photomicrograph taken using a scanning electron microscope of a superabrasive compact fabricated according to example 6 of the present invention.

The superabrasive compact so-formed was machined to a diameter of about 16 mm and a length of about 13 mm. Microstructural analysis was performed using scanning electron microscope and various photomicrographs are shown in FIGS. 24A-24D. FIG. 24A shows a low magnification image of the superabrasive compact illustrating the overall structure of the superabrasive compact. The superabrasive compact includes a superabrasive table 400 bonded to the substrate 402. The superabrasive table 400 includes at least three regions: an upper region 404 comprising diamond-silicon carbide composite, a lower region 406 bonded to the substrate that includes cobalt swept-in from the substrate, a transition region 305 therebetween. FIG. 24B shows the microstructure of the upper region 404 of the superabrasive table 400. The upper region 404 includes diamond grains (dark angular features) bonded together by a matrix (lighter region). The matrix is currently believed by the inventors to be silicon carbide and some un-reacted silicon. FIG. 24C shows the microstructure of the lower region 406 of the superabrasive table 400. The lower region 406 includes diamond grains (dark angular features) bonded together by a matrix (lighter region). The matrix of the lower region 406 is currently believed by the inventors to include cobalt swept-in from the substrate, silicon carbide, and various cobalt silicides (e.g., $Co_2Si$, $CoSi$, and $CoSi_2$). Carbon precipitates may also be present in the matrix of the lower region 406. FIG. 24D shows the microstructure of the transition region 405 and the upper region 404 of the superabrasive table 400. The infiltration of cobalt into the upper region 404 is currently believed to be prevented due to the formation of silicon carbide in the matrix of the upper region 404. In both the upper region 404 and the lower region 406, the photomicrographs of FIGS. 24B-24D show a lack of bonding between the diamond grains. The lower region 406 of the superabrasive table 400 even showed a lack of bonding between diamond grains despite the presence of cobalt, which is a metal-solvent catalyst.

Figure 25:
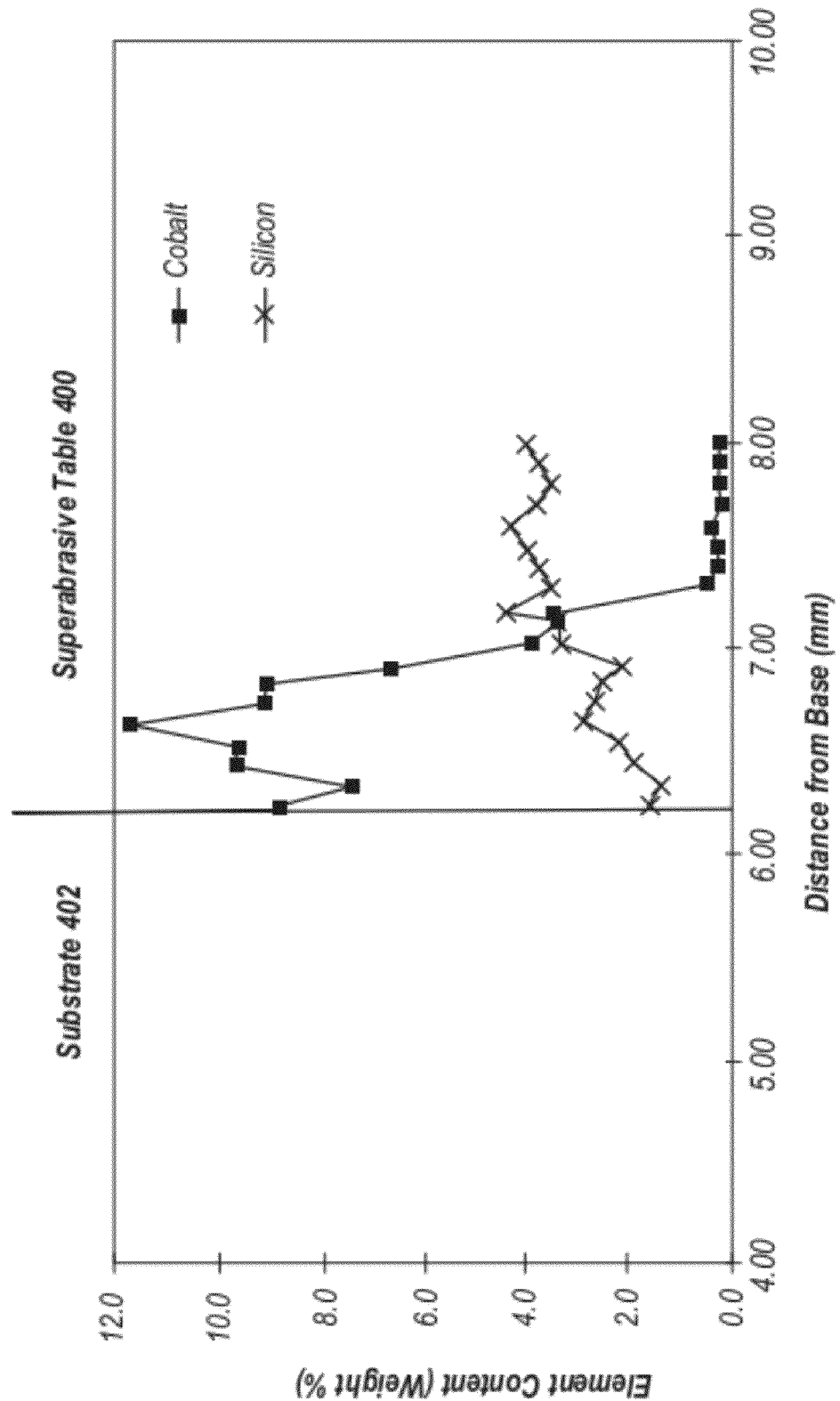
FIG. 25 is graph of the silicon and cobalt concentrations in the superabrasive table shown in FIG. 24A.

Elemental analysis was performed on the superabrasive compact using EDS. FIG. 25 shows the concentration in weight percentage of cobalt and silicon present in the superabrasive table 400. As shown in FIG. 25, the concentration of cobalt decreases more gradually with distance from the lower region 406 than in the superabrasive compact of example 5. The concentration of cobalt decreases across the transition region 405 to a concentration of approximately zero at or near the interface between the upper region 404 and the transition region 405. Silicon is present in the upper region 404, lower region 406, and transition region 405 of the superabrasive table 400.

EXAMPLE 7

A mixture comprising about 86 weight percent diamond particles with a mean particle size of about 10 μm and about 14 weight percent crystalline silicon particles with an average particle size of about 35 μm was loaded into a tungsten carbide milling jar and purged with argon gas. The mixture was then mixed in a Spex 8000D mixing/milling apparatus using tungsten carbide balls for about 1.67 hours.

A first layer comprising about 2 grams of the milled mixture was distributed in the bottom of a niobium capsule. A tantalum foil barrier was place adjacent to the milled mixture. A cobalt-cemented tungsten carbide substrate was then placed adjacent to the tantalum barrier. The niobium capsule including the milled mixture, the tantalum barrier, and substrate was cleaned using a high-temperature vacuum process and vacuum sealed. Then, the niobium capsule, including the milled mixture, tantalum barrier, and substrate, was placed in the reaction zone of a conventional high-temperature, high-pressure apparatus and subjected to a temperature of about 1400° Celsius and a pressure of about 60 kilobar for about 6 minutes to bond the various layers together and to the substrate. The superabrasive compact so-formed included a table of diamond-silicon carbide composite defining a cutting region, a cobalt-cemented tungsten carbide substrate, and an intermediate tantalum barrier that is bonded to the substrate and the table of diamond-silicon carbide composite.

Figure 26:
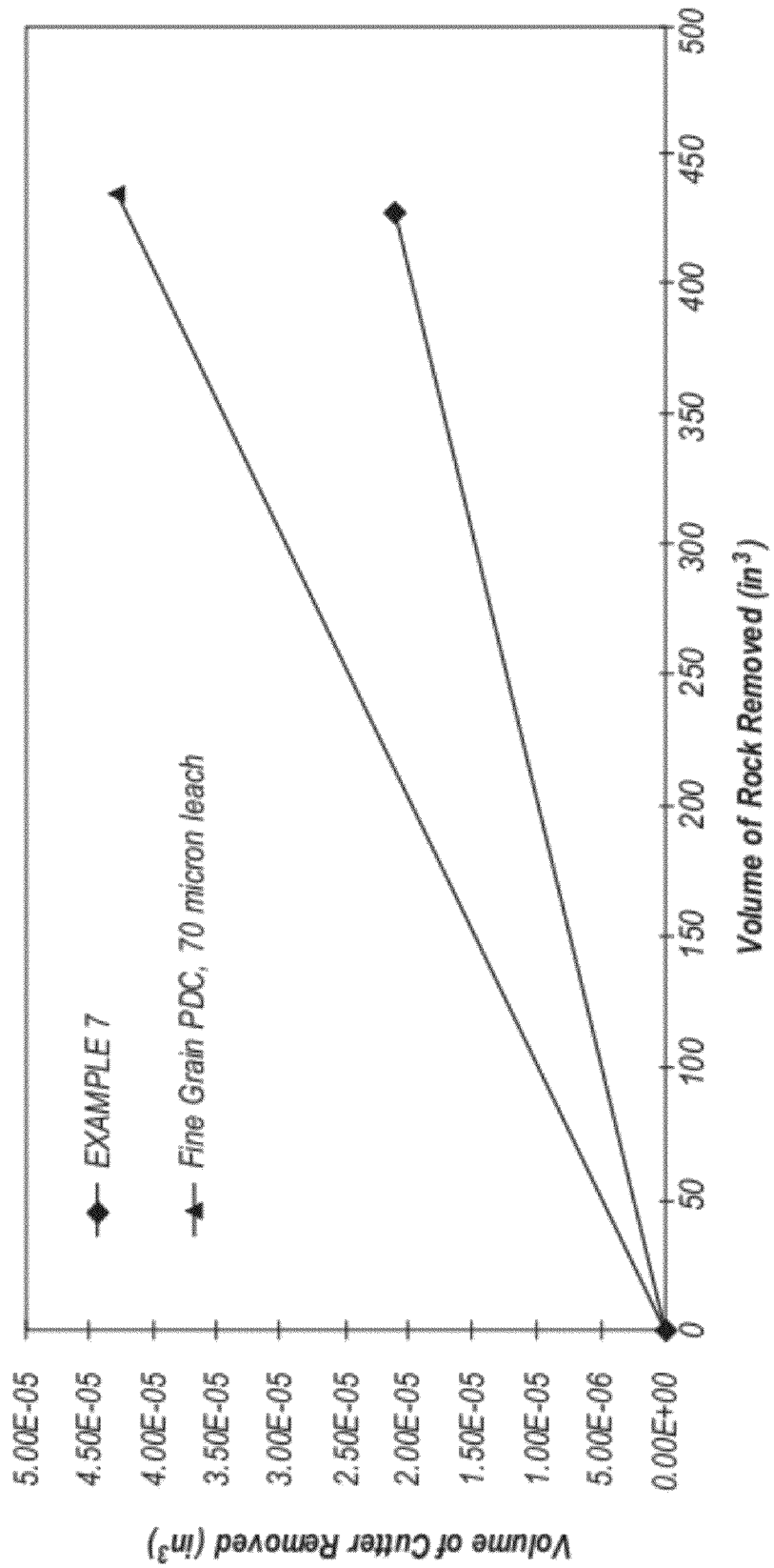
FIG. 26 is a graph illustrating wear characteristics as a function of rock volume cut for a conventional, relatively, fine grain, leached PDC and a superabrasive compact fabricated according to example 7 of the present invention.

The superabrasive compact so-formed was machined to a diameter of about 16 mm and a length of about 13 mm for wear and thermal stability testing. The wear resistance of the superabrasive compact of example 7 was also evaluated by measuring the volume of the cutting element removed versus the volume of Sierra White Granite rock removed in a vertical turret lathe at a 0.010 inch depth of cut and 100 RPM, with water used as a coolant. As shown in FIG. 26, the superabrasive compact of example 7 exhibited wear resistance similar to the conventional, fine grain, PDC described above in example 1. The thermal stability of the superabrasive compact of example 7 was also evaluated by measuring the distance cut in a Sierra White Granite workpiece in a vertical turret lathe at a 0.110 inch depth of cut and 100 RPM, without using coolant. The superabrasive compact of example 7 was able to cut a distance approximately 5 times greater than that of a conventional, fine grain, PDC similar to the conventional PDC described above in example 1. Thus, the superabrasive compact of example 7 exhibited a significantly greater thermal stability than the conventional, fine grain, PDC.

EXAMPLE 8

A mixture comprising about 82 weight percent diamond particles with a particle size of about 8 μm to about 16 μm, about 4 weight percent diamond particles with an average particle size of about 1 μm to about 3 μm, and about 14 weight percent crystalline silicon particles with an average particle size of about 35 μm was loaded into a tungsten carbide milling jar and purged with argon gas. The mixture was then mixed in a Spex 8000D mixing/milling apparatus using tungsten carbide balls for about 1.67 hours.

A first layer comprising about 1 gram of the milled mixture was distributed in the bottom of a niobium capsule. A tantalum foil barrier was placed adjacent to the milled mixture. A second layer comprising about 1 gram of diamond particles with a particle size of about 15 μm to about 25 μm was layered over the tantalum barrier. A cobalt-cemented tungsten carbide substrate was placed over the second layer of diamond particles. The niobium capsule including the first layer, tantalum barrier, second layer, and substrate was cleaned using a high-temperature vacuum process and vacuum sealed. Then, the niobium capsule, including the first layer, tantalum barrier, second layer, and substrate, was placed in the reaction zone of a conventional high-temperature, high-pressure apparatus and subjected to a temperature of about 1400° Celsius and a pressure of about 60 kilobar for about 6 minutes to bond the various layers together and bond the second layer to the substrate. The superabrasive compact so-formed included a table of diamond-silicon carbide composite defining a cutting region, a cobalt-cemented tungsten carbide substrate, a polycrystalline diamond table sintered with cobalt swept in from the substrate that is bonded to the substrate and an intermediate tantalum barrier, with the intermediate tantalum barrier being bonded to the diamond-silicon carbide composite and the polycrystalline diamond table.

Figure 27:
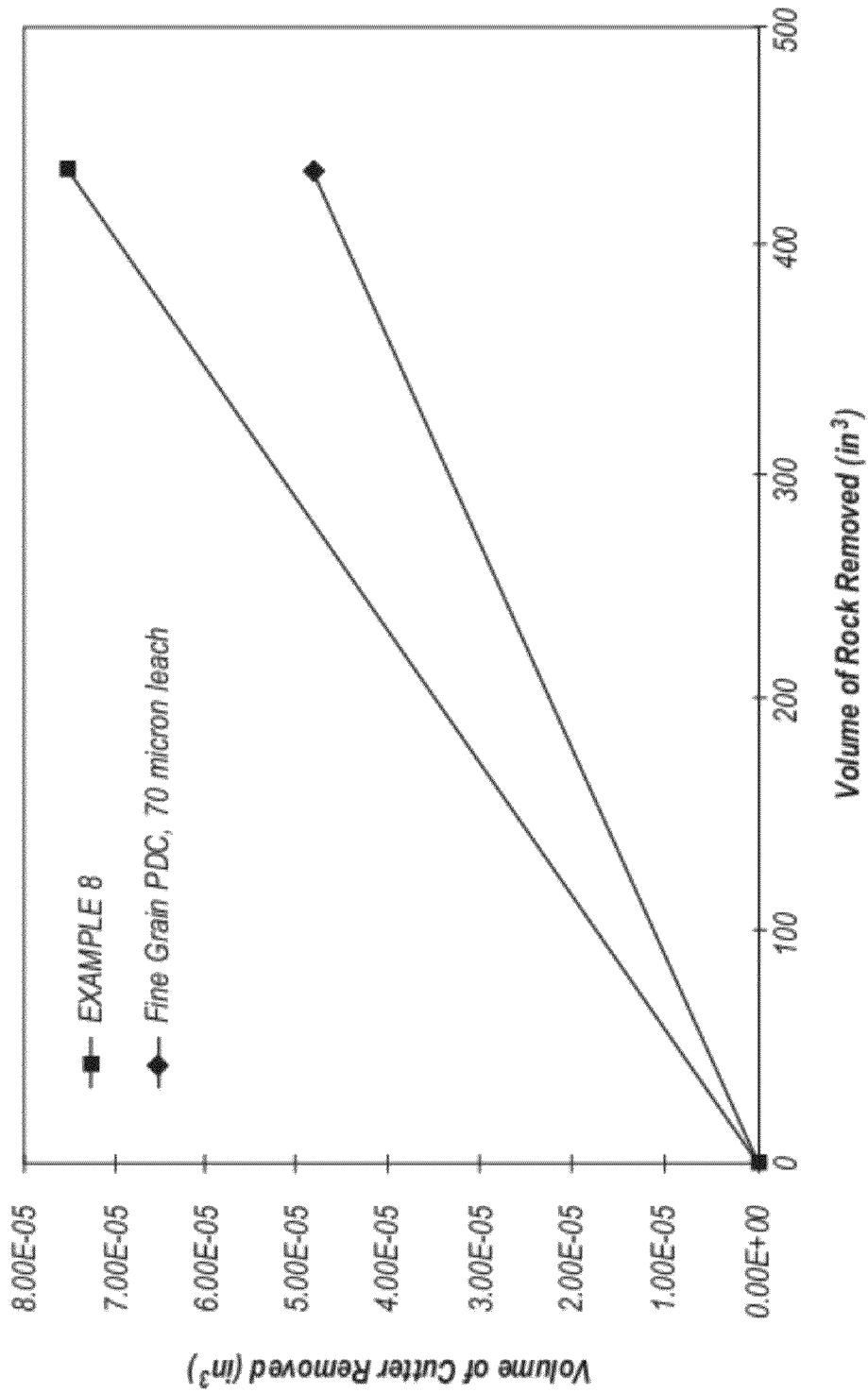
FIG. 27 is a graph illustrating wear characteristics as a function of rock volume cut for a conventional, relatively, fine grain, leached PDC and a superabrasive compact fabricated according to example 8 of the present invention.

The superabrasive compact so-formed was machined to a diameter of about 16 mm and a length of about 13 mm for wear and thermal stability testing. The wear resistance of the superabrasive compact of example 8 was also evaluated by measuring the volume of the cutting element removed versus the volume of Sierra White Granite rock removed in a vertical turret lathe at a 0.010 inch depth of cut and 100 RPM, with water used as a coolant. As shown in FIG. 27, the superabrasive compact of example 8 exhibited wear resistance similar to the conventional, fine grain, PDC described above in example 1. The thermal stability of the superabrasive compact of example 8 was also evaluated by measuring the distance cut in a Sierra White Granite workpiece in a vertical turret lathe at a 0.110 inch depth of cut and 100 RPM, without using coolant. The superabrasive compact of example 8 was able to cut a distance approximately 6 times greater than that of a conventional, fine grain, PDC similar to the conventional PDC described above in example 1. Thus, the superabrasive compact of example 8 exhibited a significantly greater thermal stability than the conventional, fine grain, PDC.

Although the present invention has been disclosed and described by way of some embodiments, it is apparent to those skilled in the art that several modifications to the described embodiments, as well as other embodiments of the present invention are possible without departing from the spirit and scope of the present invention. Additionally, the words "including" and "having," as used herein, including the claims, shall have the same meaning as the word "comprising."

What is claimed is:
1. A method of fabricating a superabrasive compact, comprising:
   forming an assembly including:
      a mixture comprising diamond particles and silicon, wherein the silicon comprises amorphous silicon, crystalline silicon crystallized from amorphous silicon formed by a milling process, or combinations thereof; and
      a substrate positioned in proximity to the mixture; and
   subjecting the assembly to a high-pressure/high-temperature process to form the superabrasive compact, the superabrasive compact comprising a superabrasive table bonded to the substrate, the superabrasive table comprising diamond-silicon carbide composite including diamond grains dispersed through a matrix comprising silicon carbide grains.

2. The method of claim 1 wherein:
the assembly comprises at least one transition layer mixture positioned between the mixture and the substrate, the at least one transition layer mixture comprising carbide particles and diamond particles; and
subjecting the assembly to a high-pressure/high-temperature process to form the superabrasive compact comprises forming the superabrasive compact with at least one transition layer disposed between the superabrasive table and the substrate, the at least one transition layer exhibiting a coefficient of thermal expansion that is greater than that of the superabrasive table and less than that of the substrate, the at least one transition layer formed at least partially from the at least one transition layer mixture.

3. The method of claim 1 wherein:
the assembly comprises at least one layer of diamond particles disposed between the mixture and the substrate; and
subjecting the assembly to a high-pressure/high-temperature process to form the superabrasive compact comprises forming the superabrasive compact with at least one polycrystalline diamond layer disposed between the superabrasive table and the substrate, the at least one polycrystalline diamond layer formed at least partially from the at least one layer of diamond particles.

4. The method of claim 1 wherein the assembly comprises a barrier material disposed between the substrate and the mixture.

5. The method of claim 1 wherein the assembly comprises a barrier material disposed between at least one layer of diamond particles and the mixture, the at least one layer of diamond particles positioned adjacent to the substrate.

6. The method of claim 1 wherein the silicon comprises substantially only the crystalline silicon formed by heating amorphous silicon mixed with the diamond particles.

7. The method of claim 1 wherein the mixture includes a toughening constituent comprising a carbide selected from the group consisting of Group IIA element carbides, Group IVA element carbides, Group IVB element carbides, Group VB element carbides, Group VIB element carbides, and combinations thereof.

8. The method of claim 1 wherein the mixture comprises alpha silicon carbide particles, beta silicon carbide particles, or combinations thereof.

9. The method of claim 1 wherein the mixture includes a toughening constituent comprising a ceramic selected from the group consisting of silicon-based ceramics, aluminum-based ceramics, boron-based ceramics, iron-oxide-based ceramics, yttrium-based ceramics, zinc-based ceramics, zirconium-based ceramics, and combinations thereof.

10. The method of claim 1, further comprising forming the mixture by milling the diamond particles and crystalline silicon particles to transform substantially all of the crystalline silicon particles to the amorphous silicon.

11. The method of claim 10 wherein milling the diamond particles and crystalline silicon to transform substantially all of the crystalline silicon to the amorphous silicon comprises ball milling the diamond particles and the crystalline silicon particles.

12. The method of claim 10 wherein milling the diamond particles and crystalline silicon to transform substantially all of the crystalline silicon to the amorphous silicon comprises attrition milling the diamond particles and the crystalline silicon particles.

13. The method of claim 10 wherein milling the diamond particles and crystalline silicon to transform substantially all of the crystalline silicon to the amorphous silicon comprises jet milling the diamond particles and the crystalline silicon particles.

14. The method of claim 1, further comprising forming the mixture by at least partially coating the diamond particles with the silicon.

15. The method of claim 14 wherein at least partially coating the diamond particles with the silicon comprises thermal spraying the silicon onto the diamond particles.

16. The method of claim 14 wherein at least partially coating the diamond particles with the silicon comprises depositing the silicon via chemical vapor deposition onto the diamond particles.

17. The method of claim 1 wherein the diamond particles of the mixture comprise micrometer-sized diamond particles exhibiting an average particle size of at least about 1 μm and nanometer-sized diamond particles exhibiting an average particle size of about 10 nm to about 150 nm.

18. The method of claim 1 wherein the silicon carbide grains of the diamond-silicon carbide composite exhibit an average grain size of about 10 nm to about 500 nm.

19. The method of claim 1 wherein:
the diamond grains are micrometer-sized diamond grains; and
the silicon carbide grains are nanometer-sized silicon carbide grains.

20. The method of claim 19 wherein:
the micrometer-sized diamond grains exhibit an average grain size of at least about 1 μm; and
the nanometer-sized silicon carbide grains exhibit an average grain size of about 10 nm to about 500 nm.

21. A method of fabricating a superabrasive compact, comprising:
forming a mixture comprising diamond particles and silicon, wherein the silicon comprises amorphous silicon, crystalline silicon crystallized from amorphous silicon formed by a milling process, or combinations thereof;
subjecting the mixture to a high-pressure/high-temperature process to form the superabrasive table, wherein the superabrasive table comprises diamond-silicon carbide composite including diamond grains dispersed through a matrix comprising silicon carbide grains; and
bonding the superabrasive table over a substrate.

22. The method of claim 21, further comprising:
forming a polycrystalline diamond table; and
wherein bonding the superabrasive table over a substrate comprises bonding the polycrystalline diamond table to the substrate and the superabrasive table.

23. The method of claim 22 wherein forming a polycrystalline diamond table comprises forming the polycrystalline diamond table in the same high-pressure/high-temperature process used to form the superabrasive table.

24. The method of claim 22 wherein forming a polycrystalline diamond table comprises forming the polycrystalline diamond table in a separate high-pressure/high-temperature process than used to form the superabrasive table.

25. The method of claim 21 wherein:
the diamond grains are micrometer-sized diamond grains; and
the silicon carbide grains are nanometer-sized silicon carbide grains.

26. The method of claim 25 wherein:
the micrometer-sized diamond grains exhibit an average grain size of at least about 1 μm; and
the nanometer-sized silicon carbide grains exhibit an average grain size of about 10 nm to about 500 nm.

27. A method of fabricating a superabrasive compact, comprising:
forming an assembly including:
a mixture comprising diamond particles and silicon, wherein the silicon comprises amorphous silicon, crystalline silicon crystallized from amorphous silicon formed by a milling process, or combinations thereof;
a substrate; and
at least one transition layer mixture disposed between the substrate and the mixture; and
subjecting the assembly to a high-pressure/high-temperature process to form the superabrasive compact, the superabrasive compact comprising at least one transition layer at least partially formed from the at least one transition layer mixture that is bonded to a superabrasive table and the substrate, the superabrasive table comprising diamond-silicon carbide composite including diamond grains dispersed through a matrix comprising silicon carbide grains.

28. The method of claim 27 wherein the at least one transition layer mixture comprises carbide particles and diamond particles, and wherein the at least one transition layer exhibits a coefficient of thermal expansion that is greater than that of the superabrasive table and less than that of the substrate.

29. The method of claim 27 wherein the at least one transition layer mixture comprises at least one layer of diamond particles, and wherein the at least one transition layer comprises at least one polycrystalline diamond layer.

30. The method of claim 27 wherein:
the diamond grains are micrometer-sized diamond grains; and
the silicon carbide grains are nanometer-sized silicon carbide grains.

31. The method of claim 30 wherein:
the micrometer-sized diamond grains exhibit an average grain size of at least about 1 µm; and
the nanometer-sized silicon carbide grains exhibit an average grain size of about 10 nm to about 500 nm.

* * * * *